United States Patent
Hull et al.

(10) Patent No.: US 6,607,007 B1
(45) Date of Patent: Aug. 19, 2003

(54) CYLINDER VALVE AND BAYONET CHECK-FILTER WITH EXCESS-FLOW PROTECTION FEATURE

(76) Inventors: Wendell C. Hull, 3220 Arrowhead St., Las Cruces, NM (US) 88011; Barry E. Newton, 5032 Sun Shadow Pl., Las Cruces, NM (US) 88011

( * ) Notice: Subject to any disclaimer, the term of this patent is extended or adjusted under 35 U.S.C. 154(b) by 0 days.

(21) Appl. No.: 09/872,233

(22) Filed: May 31, 2001

(51) Int. Cl.[7] ............ F16K 1/52; F16K 17/18; F16K 31/50
(52) U.S. Cl. .......... 137/613; 137/601.2; 137/590; 137/493.9; 251/83; 251/121; 251/274
(58) Field of Search .......... 137/601.2, 601.21, 137/590, 599.14, 550, 493.9, 613; 251/83, 121, 122, 123, 264, 274; 141/286

(56) References Cited

U.S. PATENT DOCUMENTS

| | | | | |
|---|---|---|---|---|
| 368,073 A | * | 8/1887 | Convert | 251/274 |
| 1,662,291 A | * | 3/1928 | Bastian | 251/274 |
| 3,458,170 A | * | 7/1969 | Vogeli | 251/122 |
| 3,503,585 A | * | 3/1970 | Vogeli | 251/121 |
| 3,589,671 A | * | 6/1971 | Strache | 251/122 |
| 3,911,948 A | | 10/1975 | Collins, Jr. et al. | 137/505.42 |
| 4,139,469 A | | 2/1979 | Rainin et al. | 210/136 |
| 4,211,386 A | | 7/1980 | Yocum et al. | 251/122 |
| 4,228,821 A | | 10/1980 | Stark | 137/533.11 |
| 4,445,532 A | | 5/1984 | Mitchell | 137/495 |
| 4,535,806 A | | 8/1985 | Ottung | 137/493.6 |
| 4,637,426 A | * | 1/1987 | Lyon | 137/601.2 |
| 4,735,229 A | | 4/1988 | Lancaster | 137/375 |
| 4,799,646 A | * | 1/1989 | Rollett | 251/264 |
| 4,967,814 A | * | 11/1990 | Day, Jr. | 141/286 |
| 5,474,104 A | * | 12/1995 | Borland et al. | 137/601.2 |
| 5,878,992 A | | 3/1999 | Edwards et al. | 251/122 |
| 5,904,178 A | | 5/1999 | Bracey et al. | 137/505.42 |
| 6,102,367 A | * | 8/2000 | Schmitz et al. | 137/68.11 |

* cited by examiner

Primary Examiner—John Rivell
(74) Attorney, Agent, or Firm—Rod D. Baker; Peacock, Myers & Adams, P.C.

(57) ABSTRACT

A valve apparatus especially well-suited for use in gaseous oxygen delivery systems. A valve apparatus is provided that substantially reduces the risk of fire in high-pressure oxygen systems. The apparatus is particularly well-suited for use as a plug valve on ordinary cylinder containers, but may be beneficially used in any pressurized gas system, particularly oxygen systems such as those encountered in many industrial facilities. The wetted portion of the valve is isolated from threaded portions to prevent particulate contamination of the gas stream. The valve seat is located to protect it from direct impact of high-velocity gas streams. The inventive valve, and its associated inventive check-filter and excess-flow prevention features, reduces the potential for hazardous combustion at valve points within oxygen delivery systems.

20 Claims, 12 Drawing Sheets

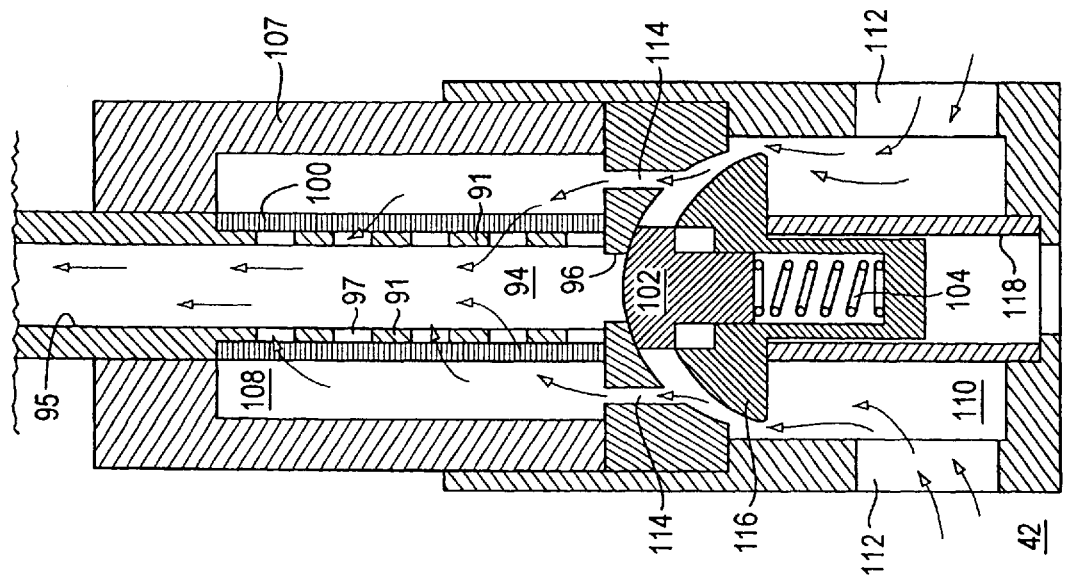
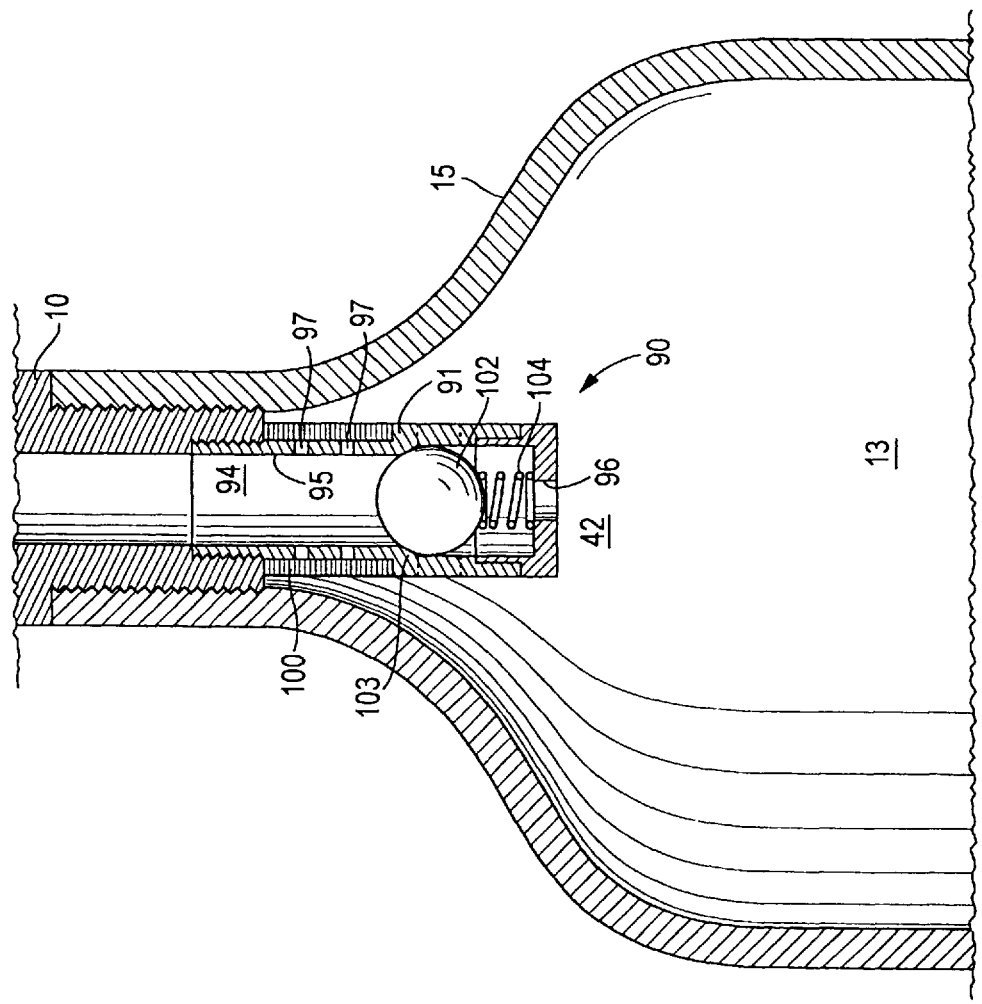

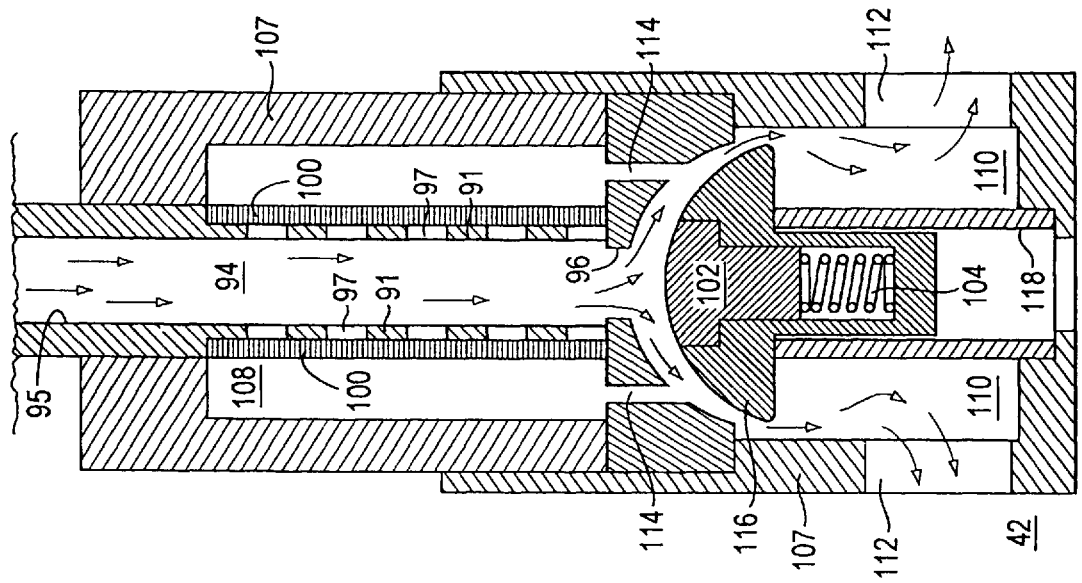
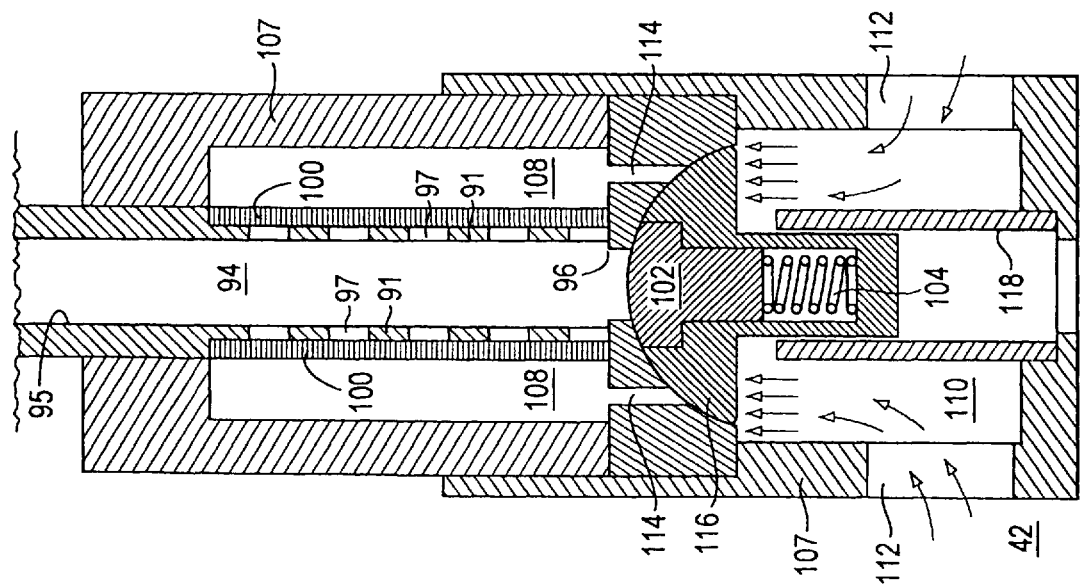

CYLINDER VALVE AND BAYONET CHECK-FILTER WITH EXCESS-FLOW PROTECTION FEATURE

BACKGROUND OF THE INVENTION

1. Field of the Invention (Technical Field)

The present invention relates to valves for controlling the flow of fluids, particularly gases, and more specifically to valves for more safely regulating the flow of oxygen gas.

2. Background Art

Oxygen is widely used in many medical and industrial applications. When a portable source of oxygen is required, it is almost universally supplied in the form of molecular oxygen ($O_2$) under pressure in a cylindrical steel or aluminum container. Oxygen commonly also is transported in such cylinders. The cylinders are equipped with a valve, used to open and close the cylinder for emptying and refilling. A pressure regulator often also is attached to the cylinder valve.

Oxygen cylinder valves, as they exist today, have been implicated in numerous fire incidents with sometimes catastrophic results. When a cylinder valve seat ignites, the attached regulator or manifold system is subjected to strong kindling chain mechanisms that will often lead to fires downstream of the cylinder valve.

The "plug type" cylinder valves presently in common use comprise a rotating threaded seat plug that translates due to the rotation of a hand wheel mounted on the top of the valve itself. The plug incorporates a relatively large nonmetallic seat. The seat is subjected to strong flow impingement during oxygen gas discharge from the cylinder, due to the seat's orientation above the valve nozzle. Further, due to the rotating seat mechanism, the seat often is subjected to strong frictional interference with the valve nozzle. Both of these features are undesirable to prudent persons aware of the fire hazards of handling oxygen cylinders. Conventional known valves are also "dirty," generating large amounts of undesirable debris due valve). This debris often deposits in the nonmetallic seat itself and increases the frictional interactions during valve opening and closing.

These valves most often utilize a nylon main seat although both polyphenylene oxide (PPO) and polychlorotrifluoroethylene (PCTFE) are also utilized. Both Nylon and PPO exhibit poor to moderate compatibility based on present oxygen-compatibility rating test standards, and deliver a large amount of energy if ignited. PCTFE is considered an oxygen compatible material, but has a compressive modulus that is insufficient to withstand the torques that are often applied by the manual closing of valves. As a result, PCTFE seated plug-valves often exhibit significant extrusion and recently have been implicated in a large number of fires. The extruded seat increases the surface-area-to-volume ratio for oxygen gas impingement during discharge, and is believed to greatly increase vulnerability of the seat to hazardous flow friction ignition.

FIG. 1 depicts the generalities of known container-and-valve construction, shown in partial cross-section to reveal the function of interior elements. These types of containers are in common use by the millions around the world, to contain oxygen and other gasses under pressure for use. A known valve assembly, shown at 10, has a plug portion 11 threaded so to be securely screwed into the correspondingly threaded opening 12 at the "top" end of a conventional pressurized gas cylinder 15 or tank. In this specification and in the claims, "top" and "bottom" and "up" and "down" refer to a valve assembly and cylinder as oriented in FIG. 1, that is, with the axis of the cylindric container perpendicular to the ground, the valve sitting atop the cylinder and the planar bottom resting upon the ground. (This is the position in which conventional cylinder tanks are commonly stored and transported, although they are used in practically any position.) However, it must be clear that the present invention may be used with the container or tank in any position with respect to vertical or to the ground, including an inverted position in which the container is above the valve while in use.

In conventional gas container valves, sometimes called Sherwood valves, the handle 17 connects to a stem 21 which is retained inside the main body 20 by a cap or jam nut. The stem 21 engages a threaded plug 23 that has a screwed engagement with the body 20 of the valve 10. A valve seat 24, typically fashioned from nylon or a flexible plastic, is retained within the distal end of the plug 23. The main body 20 has a radial port 25 through which gas can enter and exit an upper chamber 27 defined in valve body 20. The body also has a lower or first chamber 28, located about the valve's axis and via which gas may flow to and from the interior 13 of the container 15. The valve has an imaginary, central, longitudinal axis, generally describing the axis of symmetry of the body 20, and along which the handle 17 and stem 21 translate during operation. The body 20 defines an interior annular nozzle 30, a constriction dividing the lower chamber 28 from the upper, second chamber 27. The lower or first chamber 28 is in fluid connection with the second or upper chamber 27, as there is an orifice at the center of the nozzle 30 through which gas may flow. Rotation, e.g. manual rotation, of the handle 17 also rotates the stem 21 at the same rate, since the stem is connected to the handle. The plug 23 both rotates and translates in its threaded disposition within the body 20. Rotation of the handle and stem 21 thus cause the plug 23 to move axially, e.g. up and down, within the body 20. The seat 24 is contactable against the upper side of the nozzle 30 to close the nozzle orifice. Thus, the rotation of the handle 17 and stem 21 in the stem-engaging portion 19 shifts the plug 23 and seat 24 into and out of contact with the upper side of the nozzle to close and open the nozzle, and thus the valve 10, to the passage of gas. A helical spring 33 typically (but not necessarily) is employed to aid sealing of the stem packing seal. Standard clockwise rotation of the handle (as indicated by the directional arrow in FIG. 1) screws the plug 23 downward, and presses the seat 24 against the nozzle 30 to close the valve.

The foregoing commonly encountered valve design suffers from several functional drawbacks, especially when oxygen is the gas of interest. Most of the serious deleterious effects occur when a tank 15 containing oxygen under pressure is opened to discharge the oxygen for use. This discharging step is the most common circumstance of hazardous fire. Continued reference is made to FIG. 1. When the handle 17 is rotated counterclockwise to separate the seat 24 from the nozzle 30 to release oxygen under pressure from the interior 13 of the container 15, the high-velocity oxygen stream flows through the first conduit or chamber 28 and is further accelerated by passage through the orifice of the nozzle 30 en route to escape through the second port 25. Ordinarily, this high-velocity oxygen stream impacts directly upon the valve seat 24 immediately after passing through the nozzle 30. Fast-moving oxygen molecules impinging against a seat 24 commonly fashioned from nylon or plastic is a condition which fosters dangerous combustion of the seat. The combustion can then be spread downstream by the gas exiting the valve 10.

Also, it is noted that in known devices the separation of the seat 24 from the nozzle 30 occurs rapidly, i.e., just a partial rotation of the handle 17 and stem 21 may be adequate to disengage entirely the seat from the nozzle. Stated differently, the rotation of the stem 21 in the body 20 moves the seat rapidly upward, so that the axial distance of separation between the seat and the nozzle increases rapidly, resulting in a very quick change from a "fully closed" to "mostly open" flow condition. This rapid opening of the valve results in near adiabatic pressure changes which may heat valve components downstream, including the attached regulator. It also promotes deleterious mechanical friction and gas flow friction past the seat 24.

Further compromising the safety of conventional valves is the fact that the threaded portion of the plug 23 is "wetted" by the gas flow. The repeated frictional "screwed" rotation of threaded metal parts past each other commonly generates very fine metal particles and shavings, and other minute debris. When such threaded parts are wetted by the gas flow through a valve 10, this particulate debris are freely released into the interior 13 of the container 15, or may dislodged by gas flow through the second chamber 27 or may be embedded in the seat 24. The high velocity impact of this debris against combustible elements in the system, particularly in oxygen systems, can kindle fires. Thus, a safer valve for use in oxygen systems should isolate from the gas flow any threaded components that move past each other in screwed engagement.

Finally, known valves do not readily accommodate the use of filters to prevent particle migration and impact against valve components. Debris (as, for example, from the screwed engagement of the rotatable stem 21 with the body 20, as described above, or from material that migrates into the interior 13 during cylinder filling) often falls into and accumulates within the interior 13 of the pressure cylinder 15. This accumulated debris is then available to be caught up by the gas stream from the container 15 during discharge, and whisked away to the valve 10 or downstream components where it can hazardously impinge against the seat 24 and/or other system components. A safer valve would prevent the movement of debris from within the cylinder 15 by filtering the gas entering the first chamber 28 from the interior 13. However, since particulate debris will be present and blown into the cylinder when it is being filled, safety concerns recommend that such a filter not be operative during the charging of the cylinder 15, lest hazardous debris accumulate on the "wrong" side of the filter where it can be blown back into the system when the cylinder is discharged.

A need remains, therefore, for a safer valve apparatus for use in pressurized oxygen systems. The invention was developed in response to this need. The inventive valve is designed to eliminate the common ignition mechanisms that have been observed in oxygen systems and to eliminate the weaknesses observed in known plug-type valves.

SUMMARY OF THE INVENTION
(DISCLOSURE OF THE INVENTION)

The invention is a valve apparatus. More particularly, a valve apparatus is provided that substantially reduces the risk of fire in high-pressure oxygen systems. The apparatus is particularly well-suited for use as a plug valve on ordinary cylinder containers, but may be beneficially used in any pressurized gas system, particularly oxygen or oxygen-enriched air systems such as those encountered in many industrial and medical facilities or underwater diving systems. The inventive valve, and its associated inventive check-filter and excess-flow prevention features, reduces the potential for hazardous combustion at valve points within oxygen delivery systems.

According to the invention, there is provided valve apparatus for controlling the flow of a gas between a high-pressure zone and a zone of lower pressure. The apparatus has a hollow body having a central axis, a threaded handle-engaging portion and a main portion; a first chamber and a second chamber, the chambers defined within the body and the first chamber in fluid communication with the high-pressure zone and the second chamber in fluid communication with the zone of lower pressure (which normally exists until the valve is fully opened); a nozzle within the body and separating the chambers; the nozzle defining an orifice for the passage of gas between the chambers; a rotatable threaded handle screwably engageable with the handle-engaging portion of the body; a stem rotatably connected with the handle whereby the handle may rotate with respect to the stem, and the stem having a distal portion; a seat on the distal portion of the stem and contactable with the nozzle to seal the orifice against the passage of gas; and at least one seal member disposed axially between the threaded handle-engaging portion and the second chamber. Rotation of the handle in the handle-engaging portion shifts the stem axially to move the seat into and out of contact with the nozzle, and wherein during its rotation, the handle rotates with respect to the stem, which is rotatably fixed in relation to the body.

The nozzle comprises a high-pressure (upstream) side adjacent the first chamber and a low-pressure (downstream) side adjacent the second chamber. In one embodiment, the stem is disposed in the second chamber and axial shifting of the stem moves the seat into and out of contact with the low-pressure side of the nozzle to close and open the orifice to the passage of gas there through. The seat may comprise an annular surface oblique in relation to the axis, wherein axial movement of the stem varies the distance between the oblique surface and the nozzle. This arrangement increases the loading contact area for the seat, reducing its load. It also reduces flow impingement by causing gas flow contact only on an angled plastic surface. Further, the nozzle may comprise an annular beveled surface defining a circumference of the orifice coaxial with oblique surface of the seat.

In a preferred embodiment, the stem is disposed in the second chamber and extends through the orifice, wherein the distal portion of the stem protrudes into the first chamber, and axial shifting of the stem moves the seat into and out of contact with the high-pressure side of the nozzle to close and open and close the orifice to the passage of gas there through.

Preferably, the stem comprises a "throttling" or choked flow portion disposed coaxially within the orifice, the throttling portion comprising an annular surface oblique in relation to the axis, wherein axial movement of the stem varies the distance between the oblique surface and the nozzle. The nozzle comprises an annular beveled surface defining a circumference of the orifice coaxial with the beveled surface. Preferably, the throttling portion and the nozzle each are made from a metal, wherein all choked flow of the gas during a charging flow and a discharging flow occurs between the throttling portion and the nozzle. Axial movement of the distal portion of the stem into the first chamber increases the distance between the oblique surface and the nozzle, wherein the rate of dilation of the distance between the oblique surface and the nozzle increases with continuing rotation of the handle. The proximate portion of the stem is in sliding contact with the body, and further comprising at least one seal member disposed radially between the proximate portion and the body, and axially between the threaded handle-engaging portion and the second chamber, wherein debris generated by the rotation of the handle in the handle-engaging portion is prevented by the stem and the seal member from entering the second chamber.

Also preferably, the handle is rotatable to move the stem between a closed position with the seat in contact with the nozzle and an open position with the seat out of contact with the nozzle; the stem is axially movable in relation to the handle, there is further provided means for biasing the stem axially away from the handle, so that when the stem is in the open position with the seat separated from the nozzle, if the gas pressure in the second chamber abruptly decreases, the resulting rapid change in the pressure gradient across the distal portion of the stem overcomes the compressive force of the means for biasing to automatically move the stem to the closed position to seal the orifice against the continued passage of gas there through.

A primary object of the present invention is to provide a valve which reduces the risk of hazardous combustion in gaseous oxygen delivery systems.

A primary advantage of the present invention is that the valve apparatus eliminates the possibility that debris generated by the action of threaded engagement between valve parts will find its way into the gas-wetted portion of the apparatus, by (a) isolating the wetted portions of the valve from the portions of the apparatus that abrade each other by screwed engagement, and (b) by providing a valve stem that does not rotate when the valve handle is rotated, yet rotation of the handle shifts the valve stem axially.

Another advantage of the invention is that fragile valve seat components are protected against the direct impact of high-velocity gases and any debris entrained therein.

Another advantage of the invention is that a check valve and filter mechanism is provided that permits foreign debris to enter a pressure tank, but which traps the debris behind a filter barrier to prevent the debris from entering a gas-delivery system.

Still another advantage of the invention is that it provides an excess-flow shut-off feature, so that the invention automatically stops the flow of gas there through in the event of a catastrophic leak, failure, or compromise in a downstream system.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 17 is an axial sectional view of the filter check-valve mechanism seen in FIGS. 16 and 12, showing the disposition and relation of the filter check valve to and within a conventional gas cylinder;

FIG. 18A is an axial view of an alternative version of a filter check valve mechanism according to the present invention, with an excess flow check valve feature, the check valve being shown in the open "normal discharge" condition;

FIG. 18B is an axial view of the filter check valve mechanism, with an excess flow check valve feature as depicted in FIG. 18A, the check valve being shown in the closed "excess flow" condition; and FIG. 18C is an axial view of the a filter check valve mechanism, with an excess flow check valve feature as depicted in FIG. 18A, the check valve being shown in the open "normal charge" condition.

Figure 1:
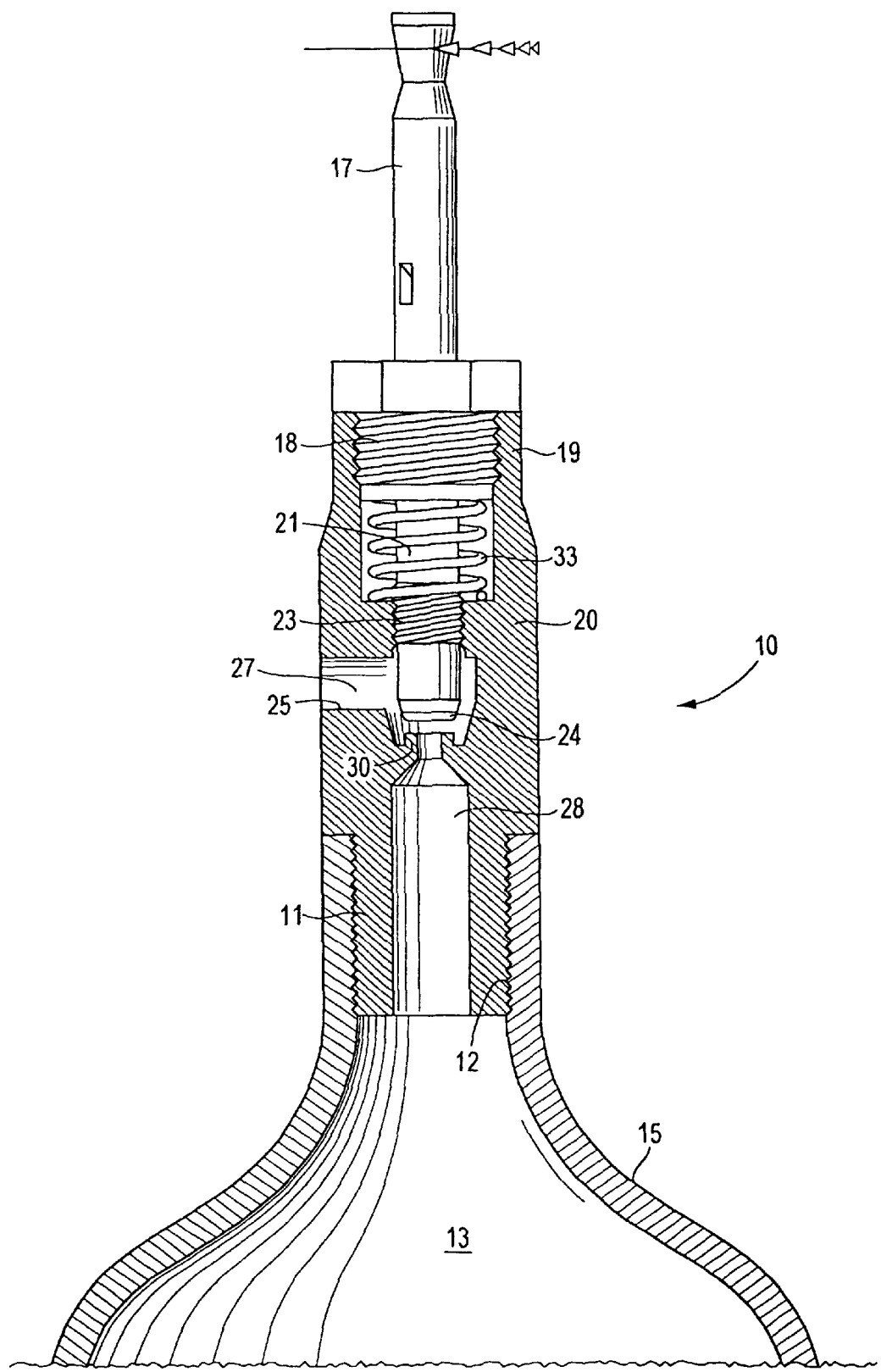
FIG. 1 is an axial sectional view of a typical oxygen cylinder valve device known in the art.

DESCRIPTION OF THE PREFERRED EMBODIMENTS (BEST MODES FOR CARRYING OUT THE INVENTION)

The inventive valve ameliorates vulnerability to the common ignition mechanisms that are observed in oxygen systems. The invention incorporates the recommended design criteria that have been established in standards such as ASTM G88, "Design Guide for Oxygen Systems," ASTM G128, "Control of Hazards and Risks in Oxygen Enriched Systems," ASTM G63, "Evaluating Nonmetallic Materials for Oxygen Service," and ASTM G94, "Evaluating Metals for Oxygen Service." The ignition mechanisms that are specifically eliminated by the design features of this valve are adiabatic compression, flow friction/flow erosion, particle impact, mechanical impact, frictional heating, and kindling chain/promoted ignition. Before disclosing specifics of the invention, its design advantages are discussed generally.

The design of the apparatus ensures that the main seat is protected from the discharge flow and is not subject to "flow impingement." This reduces seat ignition mechanisms such as flow friction and flow erosion. The seat design utilizes an O-ring seal or plastic seal that is located under the nozzle to be fully protected from the high-velocity discharge flow. O-ring seals are not commonly found in known cylinder valve designs, but are known to be superior to plastic for long life and forgiving operation. The seat of the present design, however, can utilize either an O-ring seal or a molded plastic seal; in either case, the seat/seal is located below the nozzle, for superior protection from flow-induced dynamics, rather than above the nozzle as in other cylinder valve designs, which is the worst possible orientation for flow induced ignition potential. Presently known cylinder valve designs, for oxidizing service, locate the seat/seal above the nozzle, and ignition of the seat due to this orientation has been implicated in a number of oxygen valve fires.

The inventive design ensures that all throttling or choked flow of the oxygen during discharge, or charging flow, occurs at a metal-to-metal interface. During discharge flow, the throttling occurs downstream of the seat, rather than across the nonmetallic element of the seat, as in the current plug-type valves. During charging flow, the throttling occurs upstream of the seat, but still at a metal-to-metal interface. This design feature reduces ignition potential by "flow erosion/friction," which is very severe for non-metallic surfaces.

Also, the design of the present valve apparatus ensures that the valve will open slowly throughout the first full turn of the handle. Typical other valves open progressively faster with each partial or full turn of the valve handle, and therefore the gas flow increases rapidly to near full flow during the first full turn. Rapid increases in flow foster the undesirable conditions for combustion. Further, if the handle becomes stuck, which often happens when the valve is closed, due to the need to progressively coin, or depress, the plastic seat each time the valve is closed, rapid opening occurs because the valve breaks free suddenly. This valve design eliminates this deficiency by locating the seat under the nozzle to eradicate the need for excessive closing torques to fully seal the valve when closed. As a result of the seat being located under the nozzle, the cylinder pressure will aid positive closure of the valve rather than resist it as in valves with seats located above the nozzle. The O-ring seat will also ensure leak-free closure at low torque, due to its elastomeric properties, and is far superior to plastic seats for producing leak-free conditions.

In the present valve, no packing is present; rather, a dynamic seal design is used for greater sealing efficiency at high pressure, regardless of the stem location. This seal will effectively seal the stem at any position of the valve. Since no packing is present, any tendency for the valve to stick is eliminated; the valve will seat smoothly and open smoothly. This design feature removes the need to backseat the packing, as is the case with other cylinder valve designs.

In the present design, active threads are not in the oxygen-wetted portion of the valve. The design, therefore, operates cleanly and does not produce debris, which would increase a number of ignition mechanisms including particle impact. Further, the design utilizes a non-rotating seat to preserve the seat condition and decrease seat ignition mechanisms such as frictional interaction.

An advantageous optional feature of the preferred embodiment is a provision for filtration of the flow from the cylinder, without filtering the flow into the cylinder, by virtue of a bayonet check-filter device. This feature allows particulate and debris entrained in the flow during cylinder charging operations to drop harmlessly into the cylinder, but prevents particulate in the cylinder from migrating out during normal discharging operations. The bayonet check-filter device is an innovative feature of the valve, and reduces a number of ignition mechanisms, especially particle impact, for downstream components. This beneficial feature may be used alone, and could be extended for installations on other valve designs, cylinder or tube bank installations, or even retrofitted to existing valves.

Preferably, the metals and nonmetals from which the invention is fabricated exhibit the best oxygen compatibility and histories of use for materials utilized in oxygen service. In the preferred embodiment, such materials are consistent with the guidelines provides in ASTM G63 and ASTM G94.

It should be understood that the valve of the present invention is suitable for use with any gas whose flow is to be controlled by the operation of a valve. However, the apparatus is particularly well-suited to improve the safety of valved control of the flow of oxygen. Also, it is to be noted that the valve according to the invention is adapted for use upon the commonly encountered conventional cylinder gas containers. Thus, it may be employed in the "aftermarket" to be installed upon existing cylinders to improve safety. Alternatively, the apparatus may be manufactured and sold as original equipment manufacturer product accompanying new cylinders.

As previously explained, the most hazardous conditions in oxygen valve systems occur during a "discharge" condition, when gas is being released from a zone of high pressure, e.g., the interior of a cylinder, to a zone of lower pressure, e.g., a "downstream" tube or pipe. The present invention was developed to ameliorate these hazardous discharge conditions. Accordingly, in this specification and in the claims, reference is made to a "zone of high pressure" and a "zone of lower pressure." These terms are intended to be relative, that is, the high pressure zone is simply a location having a gas pressure that is relatively greater than in the zone of lower pressure during times after the valve is opened and choked flow is occurring; no absolute pressure measurements are suggested. Further, it is readily understood by a person of ordinary skill in the art that after the valve has been opened and when choked flow has ceased, pressure in the valve obtains a condition of near equilibrium at a constant flow; accordingly, "high pressure zone" and "low pressure zone" are used to provide functional context for the inventive apparatus, rather than to strictly delimit operative conditions Thus, the typical scenario will be that where the interior of a pressure cylinder container is the zone of higher pressure, and it is desired to safely discharge the gas into a downstream tube, the tube being the zone of lower pressure. So, the inventive valve is provided safely to regulate the flow from the high pressure zone toward the low pressure zone—typically the inside of the cylinder and the exterior of the cylinder, respectively, with the valve controlling the flow from the one to the other.

Nevertheless, it will be clear to one of ordinary skill in the art that the references to a zone of lower pressure and a zone of high pressure, such references being made for the sake of clarity of description, do not preclude the inventive valve from being used as a gas conduit during the "charging" of a cylinder. During the charging of a cylinder, of course, gas flows from a "high pressure zone" outside the cylinder into the interior space of comparatively lower absolute pressure within the container, until the container is filled to the desired level. References in this specification and the claims to the zones of high and lower pressure should be construed to apply to any situation where it is desired to meter the flow of a gas across a pressure differential, whether the circumstance be the discharge of a cylinder or a flow between two zones of a more complex system.

Figure 13:
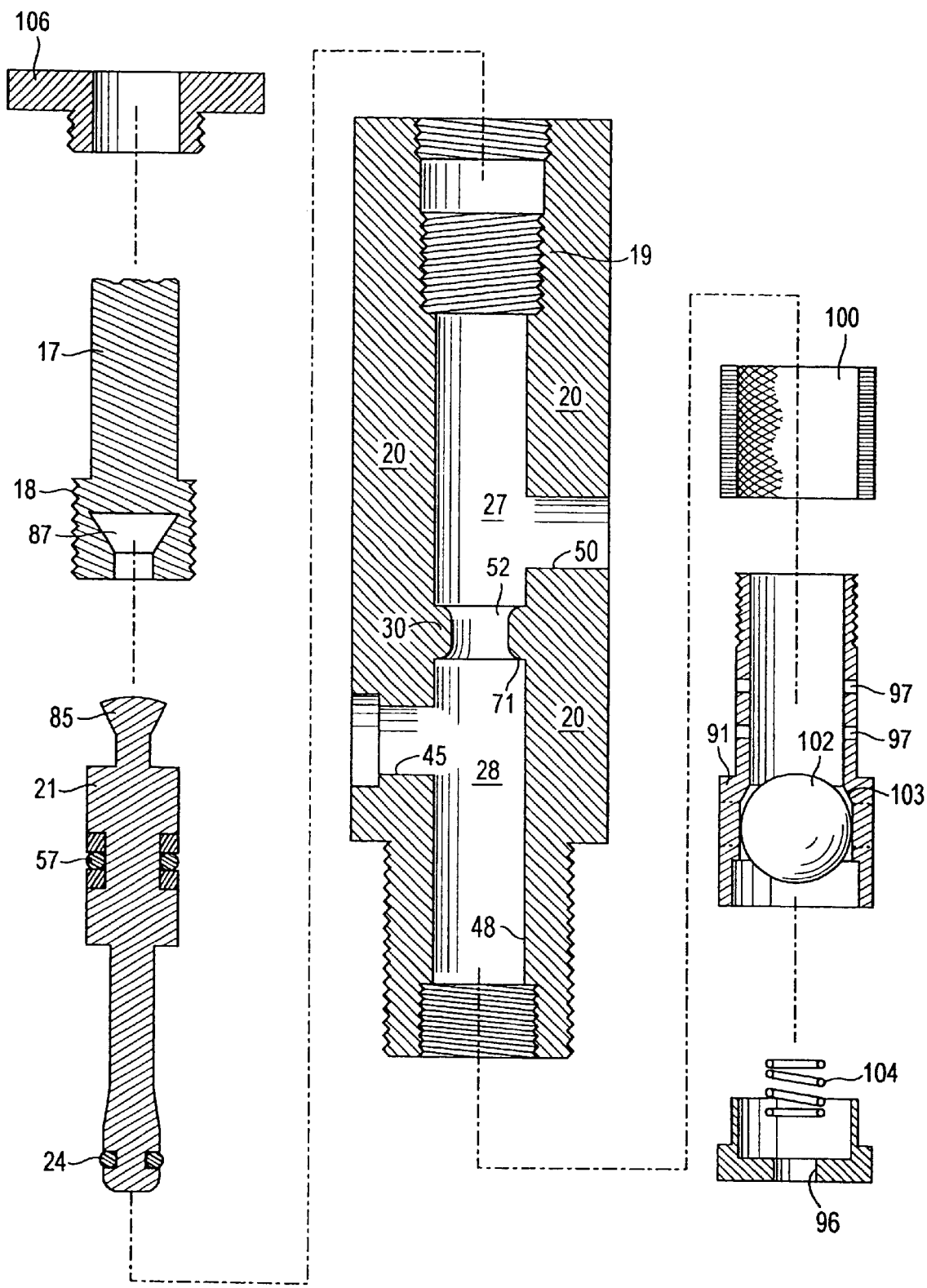
FIG. 13 is an exploded axial sectional view of the apparatus depicted in FIG. 12.

FIGS. 2–13 collectively depict the preferred embodiment of the present invention. FIGS. 8–12 show the preferred embodiment fully assembled, while FIG. 13 is an exploded view to clarify positional relationships among the components. FIGS. 2–7 offer certain enlarged views as shall be explained more fully herein. The valve 40 according to the present invention has a configuration, in its most general respects, somewhat similar to the valve 10 known in the art and seen in FIG. 1, and thus has some functional aspects in common therewith, so that the foregoing description of the conventional assembly 10 provides background for the description of the inventive valve assembly 40. Nevertheless, important distinctions and points of departure that result in the present valve being much safer are now described and otherwise will become evident.

Figure 7:
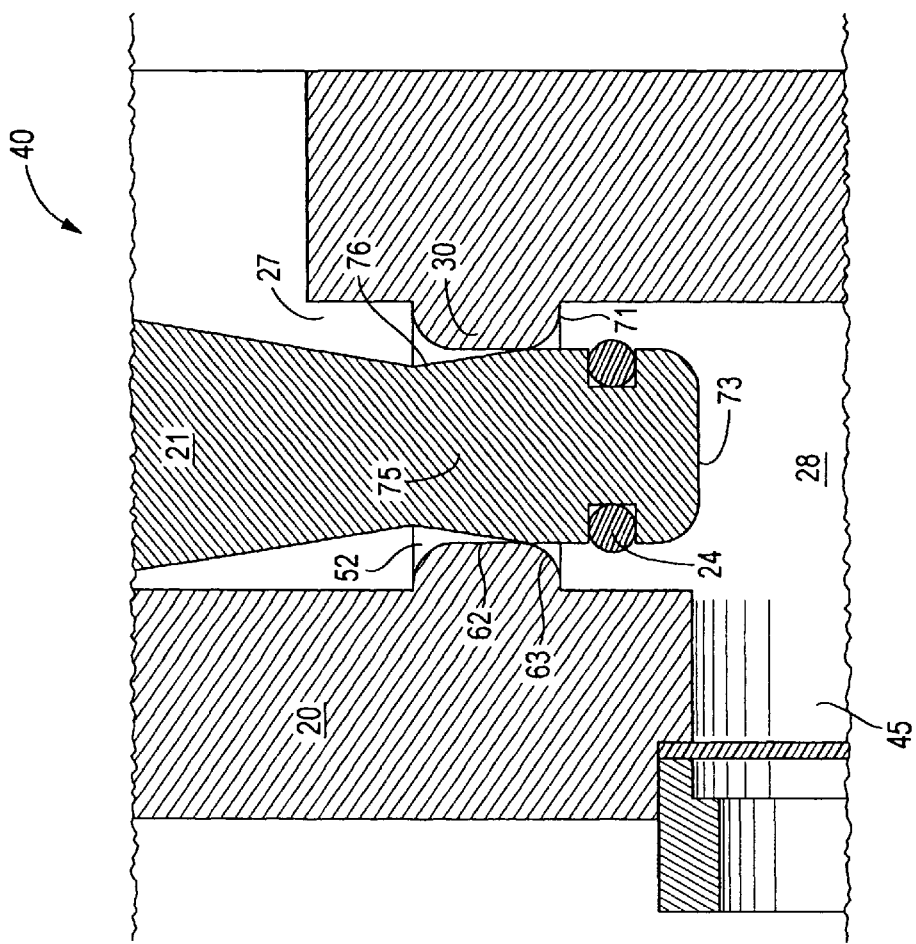
FIG. 7 is an enlarged axial sectional view of a portion of the valve shown in FIG. 6, showing the valve seat and nozzle portions of the apparatus.
Figure 8:
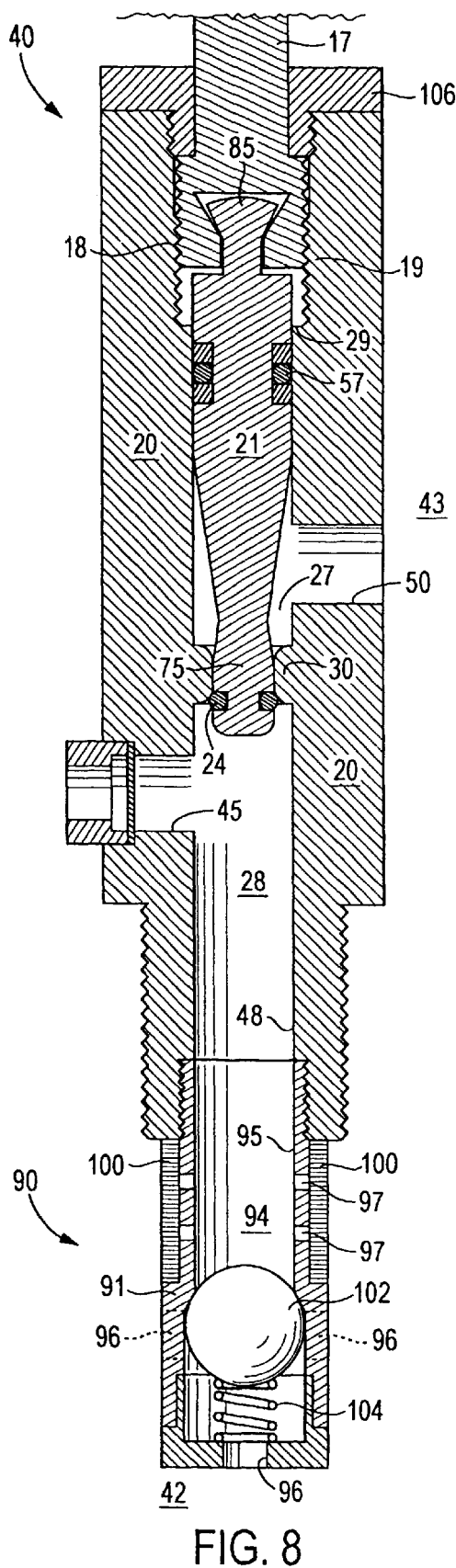
FIG. 8 is an axial sectional view of the valve according to a preferred embodiment of the present invention in a closed position, together with the filter check valve according to the invention also in a closed condition.
Figure 9:
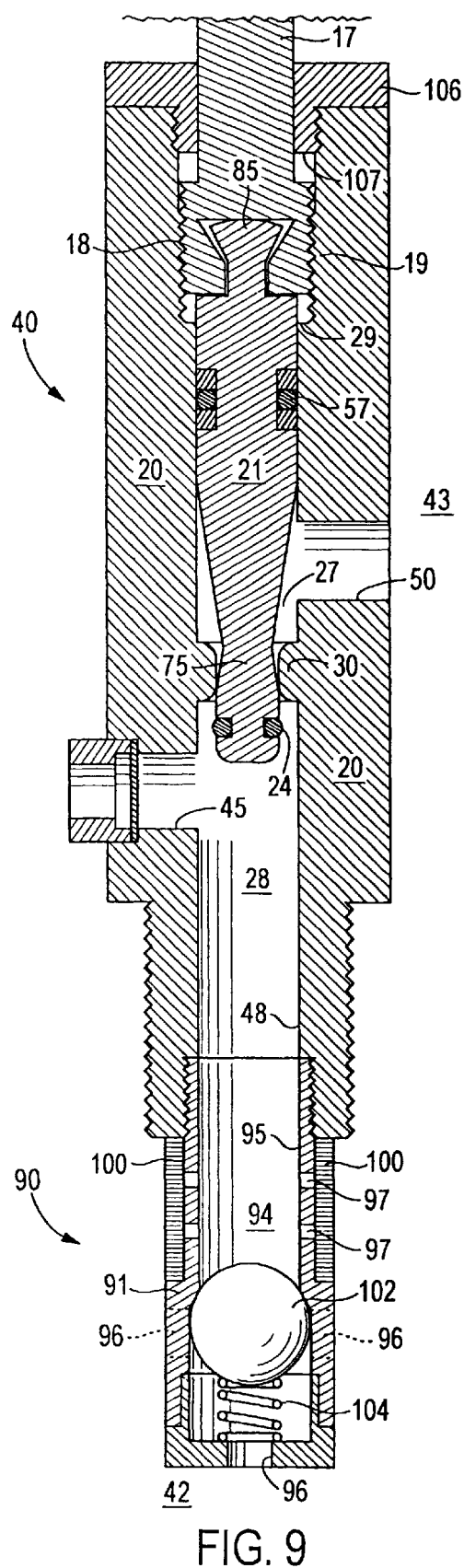
FIG. 9 is an axial sectional view of the valve according to a preferred embodiment of the present invention in the "one turn open" position, together with the filter check valve according to the invention in a closed condition.
Figure 10:
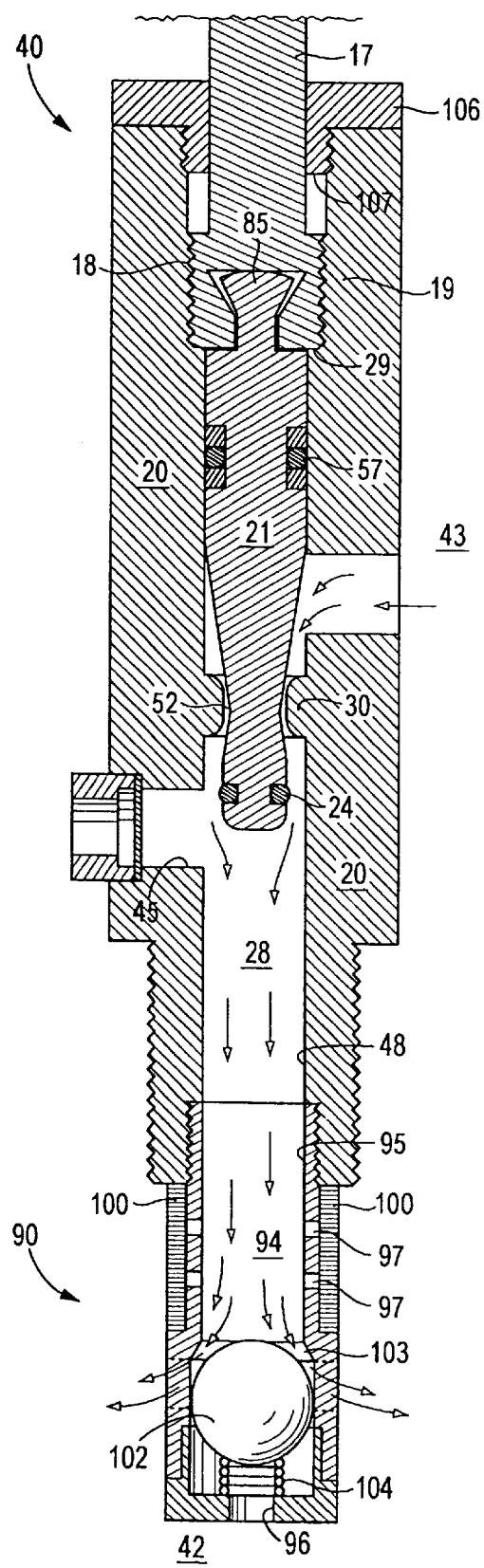
FIG. 10 is an axial sectional view of the valve according to a preferred embodiment of the present invention in the full open position, together with the filter check valve according to the invention in an open position to permit gas to flow through the valve along a charging route.

The valve 40 is used for controlling the flow of a gas from a high-pressure zone 42, such as the interior of a cylinder container (not shown in FIGS. 2–13) to a zone of lower pressure 43, such as a tube or conduit (also not shown) sealably attached to the outlet port 50 (FIGS. 8–10). The valve 40 has a hollow body 20 that may be generally cylindrical with a central longitudinal axis. The body 20 receives a threaded handle-engaging nut 106, and is manufactured from any suitable material, such as brass, known to the industry. Defined by and within the body 20 are the lower or first chamber 28 and the upper or second chamber 27. The first chamber 28 preferably is a generally cylindrical conduit that opens to, or is in fluid communication with, the high pressure zone 42 via intake port 48 as seen in FIGS. 8–10. The first chamber 28 optionally may also have an auxiliary port 45 for receiving and permitting the use of an auxiliary device such as a pressure gauge, excess pressure relief valve, burst disc or the like. The upper or second chamber 27 is in fluid communication with the zone of lower pressure 43 by way of the outlet port 50.

Figure 3:
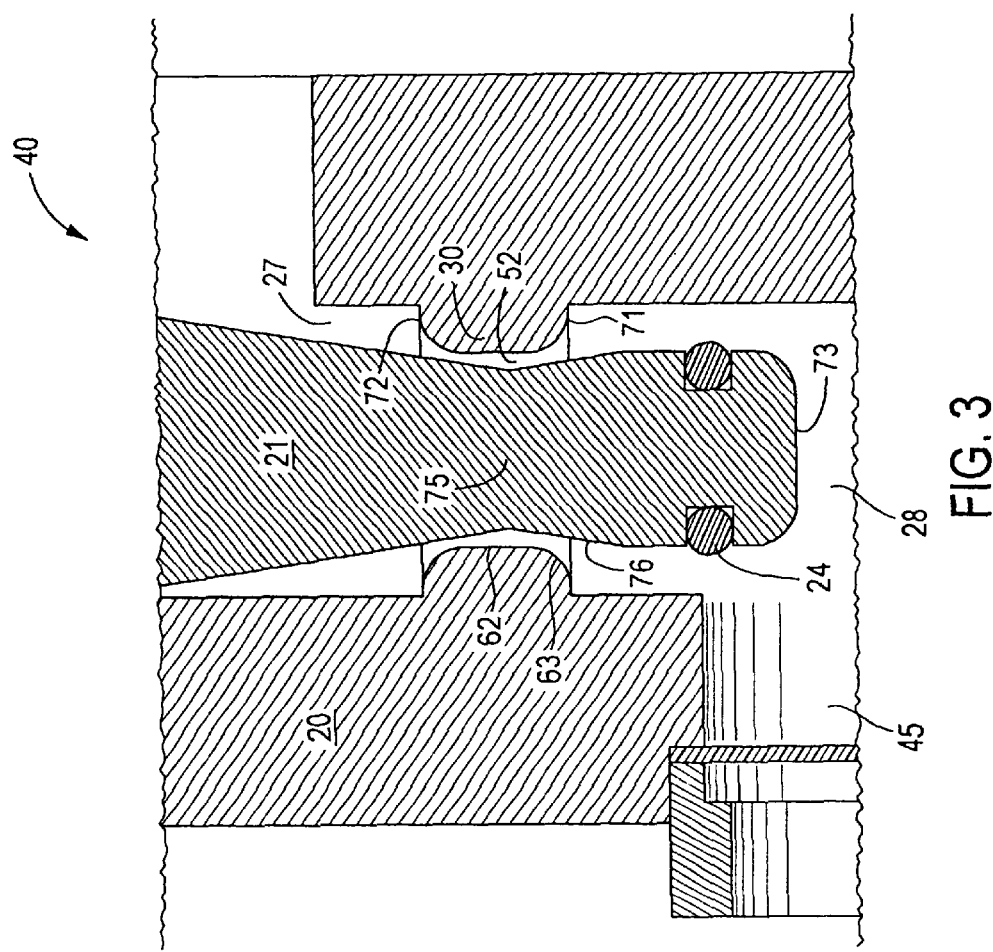
FIG. 3 is an enlarged axial sectional view of a portion of the valve shown in FIG. 2, showing the valve seat and nozzle portions of the apparatus.
Figure 5:
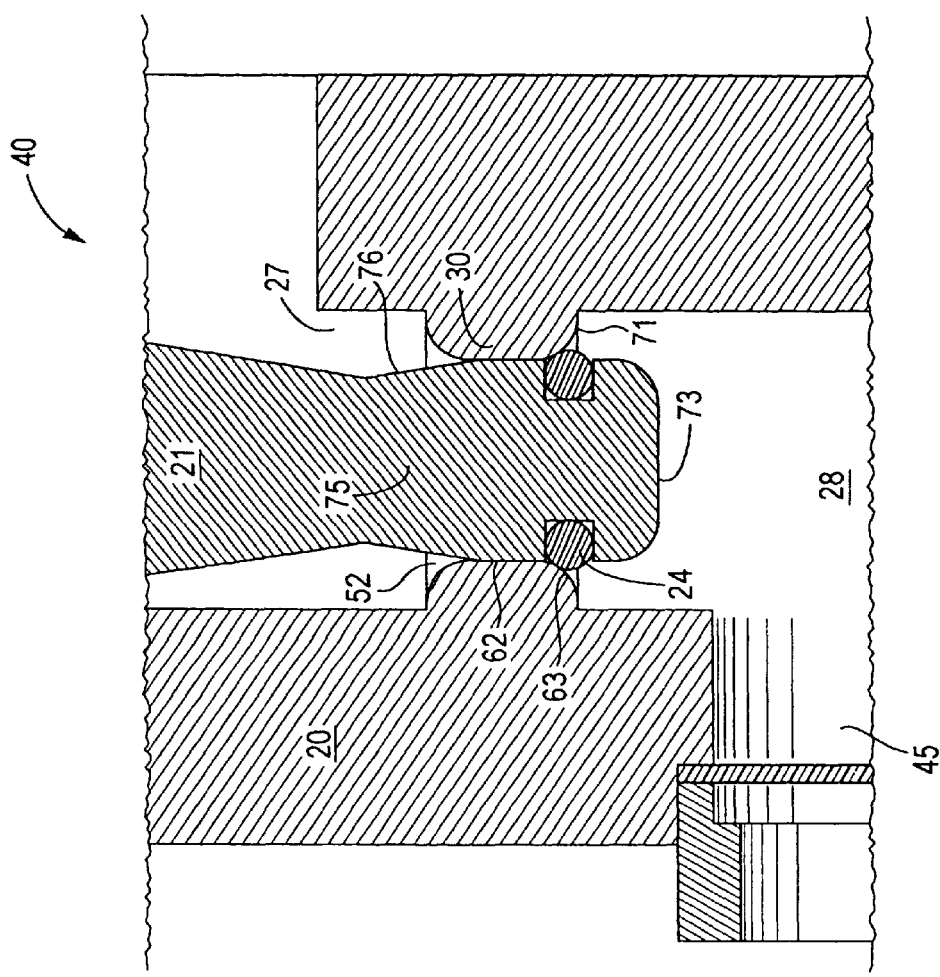
FIG. 5 is an enlarged axial sectional view of a portion of the valve shown in FIG. 4, showing the valve seat and nozzle portions of the apparatus.

A nozzle 30 is within the body 20 and preferably is machined or otherwise formed integrally with the main body. The nozzle separates the chambers 27, 28 and has a high-pressure side 71 adjacent the first chamber 28, a low-pressure side adjacent the second chamber 27, and an orifice 52 for the passage of gas between the chambers 27, 28 (FIGS. 3, 5, and 7).

A stem 21 is disposed mostly in the second chamber 27. The stem 21 has a proximal portion and a distal portion; a seat 24, such as an annular molded gasket or O-ring, is attached to the distal portion of the stem 21 and is contactable with the nozzle 30 to seal the orifice 52 against the passage of gas. The O-ring seal 24 may be fashioned from an oxygen compatible material such as CTFE or from VITON®, or less ideally from silicone rubber.

The threaded handle 17 has a threaded portion 18 that is screwably engageable with the correspondingly threaded handle-engaging portion 19 of the body, and rotatably connected to the proximate portion of the stem 21. The rotatable connection between the handle 17 and the stem 21 may be accomplished by, for example, a head flange 85 linked to the handle. The handle 17 has a cavity therein in which the stem head 85 (the proximate end of the stem 21) is rotatably disposed in a sort of "dovetail" fashion. The rotation of the handle 17, where the threaded portion 18 of the handle threadably engages the handle engaging portion 19 of the body, allows the handle to push and pull the stem 21 axially as previously described.

A handle cap 106 secures the handle 17 within the body 20. The attachment of the cap 106 to the body 20 preferably is by means of a right-hand thread screwed engagement, while the screwed engagement of the handle 17 with the body preferably is by means of a left hand thread, so that rotation of the handle will not tend to back the cap 106 out of the body.

The head flange 85 of the stem is rotatable within the cavity in the distal end of the handle 17, so that when the handle is rotated, the stem does not rotate. The rotary motion of the handle 17 therefore is not imparted to the stem 21. However, as the handle 17 shifts axially during rotation, due to its screwed engagement with the handle-engaging portion 19 and with the cap 106, such axial translation is transmitted to the stem 21.

Figure 2:
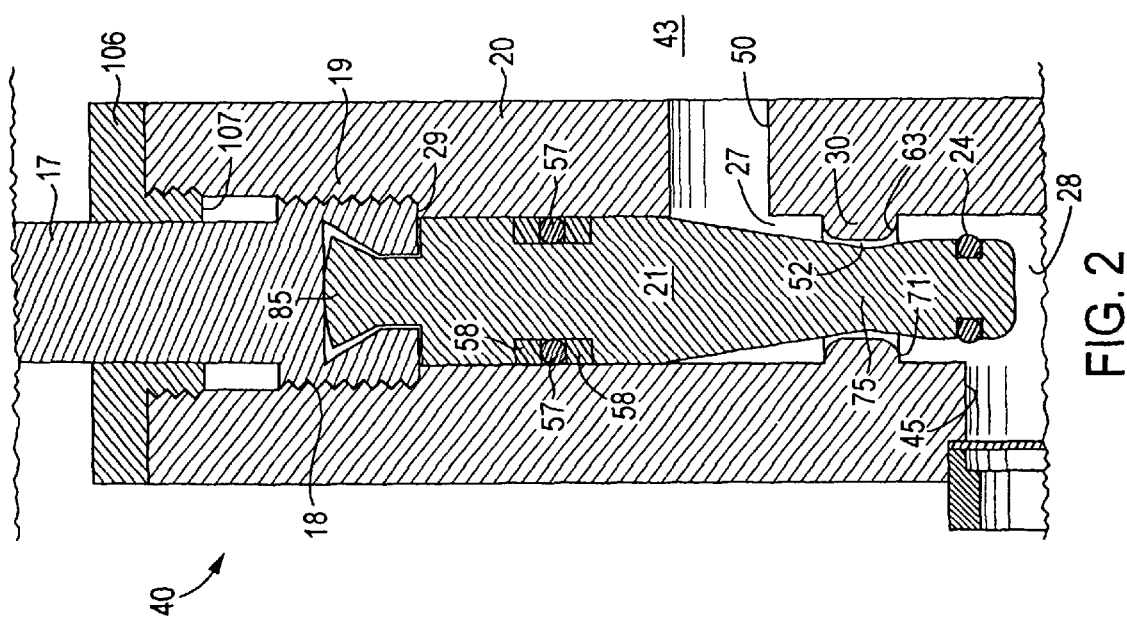
FIG. 2 is an axial sectional view of a portion of the valve according to a preferred embodiment of the inventive apparatus, shown in an open position.

The longitudinal travel of the stem preferably is controlled by contact of the handle 17 with an upper close stop 107 on the cap 106 or with the lower open stop 29 on body 20. For example, as seen in FIG. 2, the distal end of the handle 17 has contacted the lower "open" stop 29, preventing the stem 21 from moving any further downward, thereby indicating a "full open" condition. Similarly, the handle 17 has contacted the upper close stop 107 in FIG. 4, preventing the stem 21 from traveling any further upward (and thus preventing damage to the seat 24) and indicating a "full closed" condition.

Consequently, when the handle 17 is rotated (either clockwise or counterclockwise), the rotary motion is not imparted to the stem; rather, the handle 17 rotates about the valve axis, but the stem does not rotate as the handle rotates around the head flange 85. Still, the rotation of the handle 17 causes the handle to move axially with respected to the body 20, due to the screwed engagement of the handle with the handle-engaging portion 19 and the cap 106. The handle 17, therefore, is rotatable about the body axis in relation to the body and in relation to the stem 21. As the handle rotates, the stem 21 does not; yet the axial shifting of the handle 17 causes the stem to shift axially a corresponding amount, as the handle during clockwise rotation "pushes" the stem 21 down into the valve body 20, and during counterclockwise rotation "pulls" the stem up or from the valve body.

The stem 21 thus is movable axially within the body 20 but is non-rotatable in relation to the body 20. Contact between the stem 21 and the body 20 is not threaded, but rather is a smooth sliding contact, generating little or no debris from surface abrasion. Rotation of the handle 17 in the handle-engaging portion 19 controllably moves the non-rotating stem 21 axially to move the seat 24 into and out of contact with the nozzle 30 thereby closing and opening the orifice 52 to the passage of gas.

Figure 4:
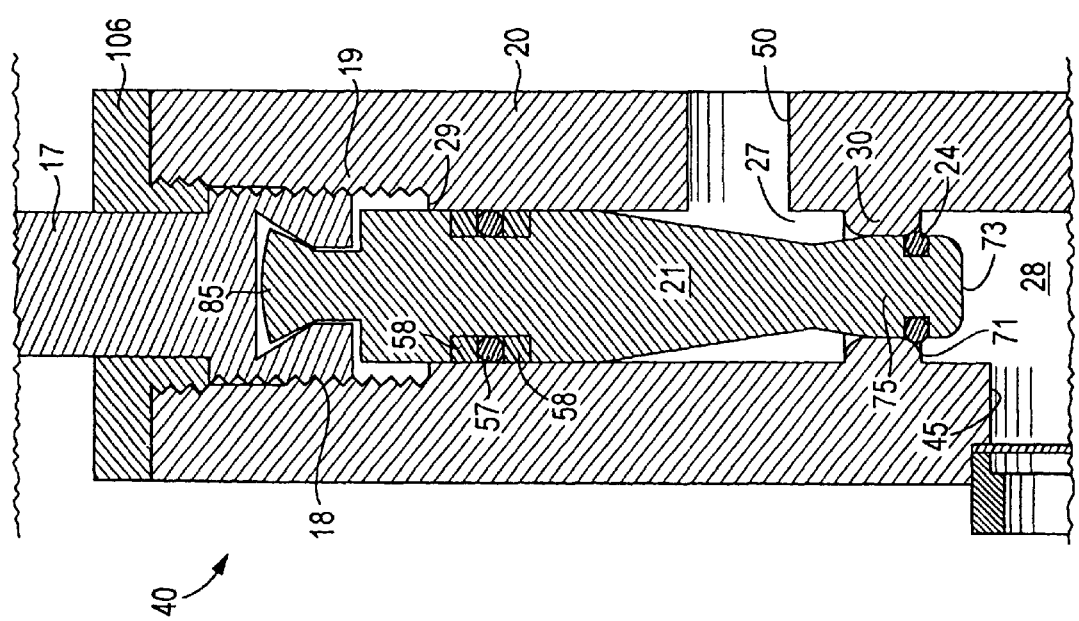
FIG. 4 is an axial sectional view of the valve according to a preferred embodiment of the inventive apparatus, shown in a closed position.
Figure 6:
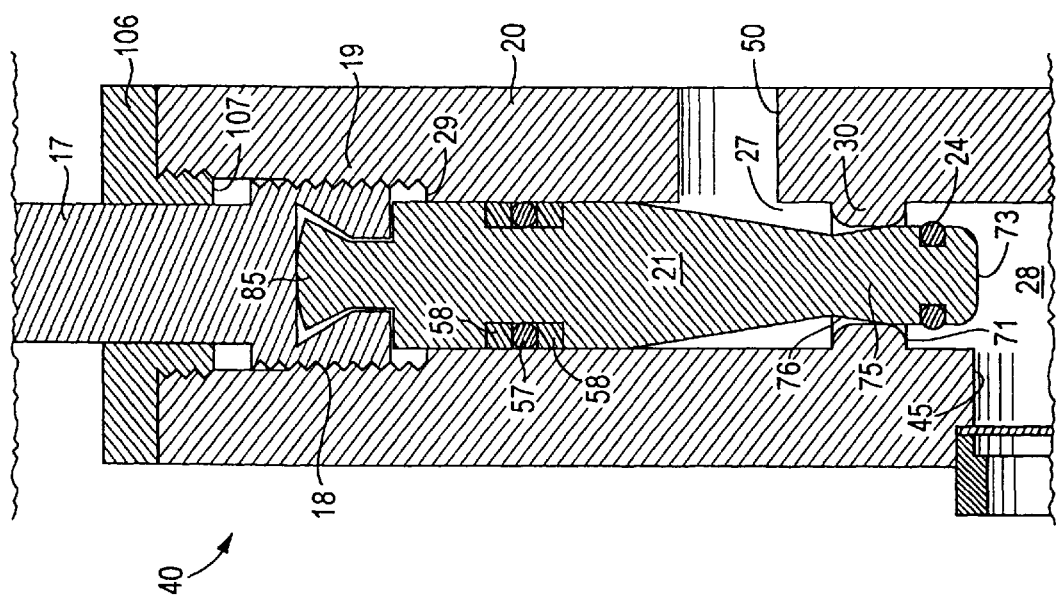
FIG. 6 is an axial sectional view of the valve according to a preferred embodiment of the inventive apparatus, shown in a partially open position after about one turn of the handle.

Because the stem 21 is non-rotating, it generates no debris that can fall into the flow of gas through the second chamber 27 and be carried into the stream exiting the outlet port 50. Further, one or more seals 57 may be disposed in an annular recess about the proximate end of the stem 21, as seen in FIGS. 2, 4, and 6. The seal 57, preferably made from VITON® flouropolymer product from DUPONT, is in sliding contact with the inside walls of the body 20, and prevents debris created by the rubbing of the threaded portion 18 of the handle with the handle-engaging portion 19 of the body from falling into the upper chamber 27. The seal 57 is supported in place and provided surge protection by a pair of back-up rings 58, made from for example, Teflon® or from chlorotriflouroethylene (CTFE). This protective sealing function may be performed by a number of different types of O-rings or gaskets 58; in any event, the threaded engagement of the handle with the body is isolated from the gas flow, and no threads are wetted thereby. Consequently, the invention advantageously features the configuration whereby the proximate portion of the stem 21 is in sliding contact with the body 20, and one or more seal members or gaskets 57 or 58 are disposed radially between the proximate portion of the stem and the body and axially between the threaded handle-engaging portion 19 and the second chamber 27, so that debris generated by the rotation of the handle 17 in the body is prevented by the stem 21 and the seal members 57 or 58 from entering the second chamber 27 where it can kindle fire. Again, one advantage of the invention is that while the proximate portion of the stem 21 is in smooth sliding contact with the walls of the body 20, the sealing member or members 57 (together with the backup rings 58) are located axially between the second chamber 27 and the threaded portion 18 of the handle (e.g., "above" the former and "below" the latter).

Most advantageous is the disposition of the seat 24 with respect to the orifice 52, as most closely seen in FIGS. 3, 5, and 7. The seat 24 is situated in an annular recess around the distal end of the stem 21. The recession of the seat 24 provides a measure of protection for the seat from direct impact thereon of gas flow through the orifice 52 from the first chamber 28 to the second chamber 27 of the valve. In this preferred embodiment, it is also seen that the very distal end 73 of the stem 21 extends beyond the axial location of the seat 24.

Thus, axial movement of the stem 21 varies the distance between the seat 24 and the beveled surface 63 of the nozzle, the distance variable between zero (closed, FIG. 5) and a maximum (full open, FIG. 3). During the opening of the valve 40, the harshest gas impacts are directed against the distal extension end 61 of the stem 21, and in the metal-to-metal portion near the orifice 52 rather than the seat 24.

Continued reference to FIGS. 2–7 show that the preferred embodiment has a specially shaped stem 21 having a gradually tapered throttling portion 75 disposable through the orifice 52. The throttling portion 75 features an annular surface 76 that is oblique in relation to the central axis of the valve 40. The nozzle 30 presents an annular beveled surface 63 defining a circumference of the orifice 52, and against which the seat 24 may be sealably pressed when the valve is closed, as seen in FIGS. 4 and 5. The throat of the nozzle 30, however, is defined by a cylindrical wall 62, the axis of the imaginary cylinder being coaxial with the axis of the stem 21. Thus, the oblique surface 76 of the throttling portion 75 is coaxial with the wall surface 62, so that axial movement of the stem 21 varies the distance between the oblique surface 76 and the wall 62 of the throat of the nozzle. Since the throttling portion 75 and the nozzle 30 each preferably are made from a durable metal, all the throttling of the gas during a charging flow or a discharging flow through the valve 40 advantageously occurs between the comparatively damage- and combustion- resistant metal throttling portion 75 and metal nozzle 30. This is an improvement over known devices, where throttling of the gas typically occurs between a nozzle and a relatively fragile and combustible valve seat 24.

Also, axial movement of the distal portion 73 of the stem 21 into the first chamber 28 increases the distance between the oblique surface 76 and the nozzle 30, and the rate of dilation of that distance increases with continuing rotation of the handle 17. Due to the positional relationships of the stem's oblique surface 76 and the beveled surface 63 of the nozzle, the rate of dilation of the distance there-between does not accelerate in the rapid fashion characteristic of known valves. Rather, the initial rotation of the handle 17 separates the seat 24 from the high pressure side 71 of the nozzle, but simultaneously induces first a gradual departure of the oblique surface 76 of the throttling portion 75 of the stem from the beveled surface 63 of the nozzle, as suggested in the "one turn open" position seen in FIG. 7. In this manner, the danger of a sudden, sonic velocity "rush" of gas from the high pressure zone 42 through the orifice 52 to the zone of lower pressure 43 is substantially and advantageously reduced.

Attention is invited to FIGS. 8–13. Preferably but optionally, the apparatus of the invention includes a bayonet filter check valve 90 to prevent particulate debris from the zone of high pressure 42 from obtaining injurious access to the valve seat 24 and downstream components. The filter check valve 90 features a hollow inner casing 91 defining an axial interior tunnel 94. The inner casing 91 has a proximate end attachable (for example, by screwed engagement) to the distal end of the body 20 body. The inner casing has at least one connection port 95 at its proximate end and in fluid communication with the first chamber 28 when the proximate end is attached to the body 20, whereby gas may flow between the first chamber 28 and the tunnel 94. The casing 91 also has a distal end having at least one charging port 96 therein in fluid communication with the tunnel 94. At least one, and preferably a plurality, of filter ports 97 are provided in the casing 91 axially intermediate to the connection port 95 and the charging port 96, through which gas may flow between the interior tunnel 94 and the exterior of the inner casing 91. The figures show that filter media 100 is disposed in or over the filter ports 97 so that gas flowing through a filter port must flow through the filter media.

Figure 16:
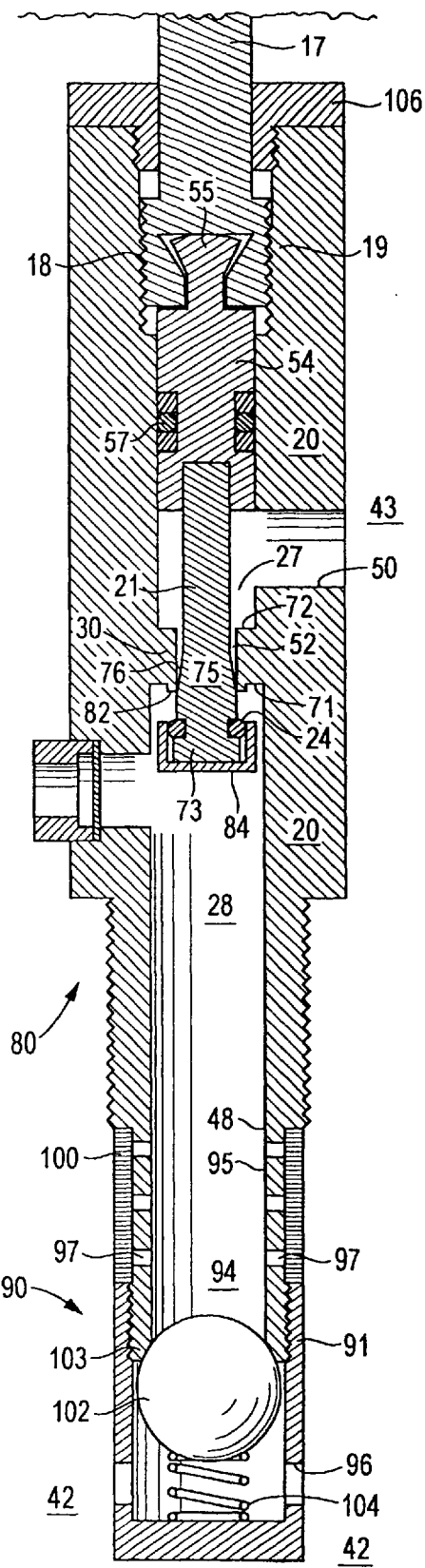
FIG. 16 is an axial sectional view of still another embodiment of the valve apparatus according to the present invention, showing another version of the non-rotating stem mechanism and a protected seat disposed below the nozzle, and more especially showing an accompanying filter check-valve feature.

A plug member 102 is disposed within the casing 91 adjacent to the charging port 96, and is movable axially between an open position and a closed position. The plug member 102 may be, for example, a spherical ball bearing, preferably a sapphire ball. In the closed position, as seen in FIG. 16, the plug member 102 is in sealing contact with the plug seat 103; when the plug member 102 is in an open position, it is disengaged and apart from the plug seat 103, such separation allowing gas to flow between the tunnel 94 and the charging port 96.

There is provided a means for biasing the plug member 102 toward the closed position in contact with the plug seat 103; the means for biasing 104 typically is a coil spring, but other alternatives are suitable and known in the art. When in the closed position, the plug member 102 prevents gas flow in the tunnel 94 directly from the charging port 96 to the connection port 95, whereby any gas flowing through the tunnel 94 is forced through the filter media 100. Further when the plug member 102 is in the open position, gas may flow through the tunnel directly from the connection port 95 to the charging port 96. Under most pressure conditions, the plug member 102 is pushed and held in sealed contact with the plug seat 103 by the action of the spring 104.

The filter check valve 90 thus protects against the damaging entry of deleterious debris into the first chamber 28 from the zone of higher pressure 42. Such debris often accumulates, for example, within the interior 13 of pressure containers 15 (FIG. 1). The debris normally is introduced into the interior during the process of charging (filling) the container 15 or through normal use.

In operation of the invention, charging gas from the zone of low pressure 43 is forced into the valve 40 via the port 50, i.e. gas is injected into the outlet port 50 to pressurize the container interior 13 (FIG. 1). During the filling or charging process, gas flows from the zone of lower pressure 43 to the zone of higher pressure 42 (whose actual pressure conditions are reversed from the labels here used, as a filling rather than emptying process is involved). During charging, gas flows from the zone of lower pressure 43, through the outlet port 50, through the second chamber 27 and the nozzle 30, on through the first chamber 28 and into the tunnel 94. The increased pressure in the tunnel 94 forces the plug member 102 axially downward and away from the plug seat 103, thus pushing the plug member 102 into an open position. The flowing gas therefor is free to flow directly from the tunnel 94 on through the charging ports 96 and into the zone of higher pressure 42 (e.g. the interior of a container cylinder) as seen in FIG. 10. The force of the charging gas flowing into the tunnel 94 overcomes the force of the means for biasing 104, and maintains it in a compressed condition and the plugging member 102 disengaged from the plug seat 103 throughout the charging process. Upon complection of the charging process, and with the cessation of gas flowing into the valve 40 from the zone of lower pressure 43, the means for biasing 104 is released and urges the plug member 102 back into contact with the seat 103 (FIG. 9) to prevent any retrograde flow of gas from the high pressure zone 42 into the tunnel 94 via the charging ports 96.

Figure 11:
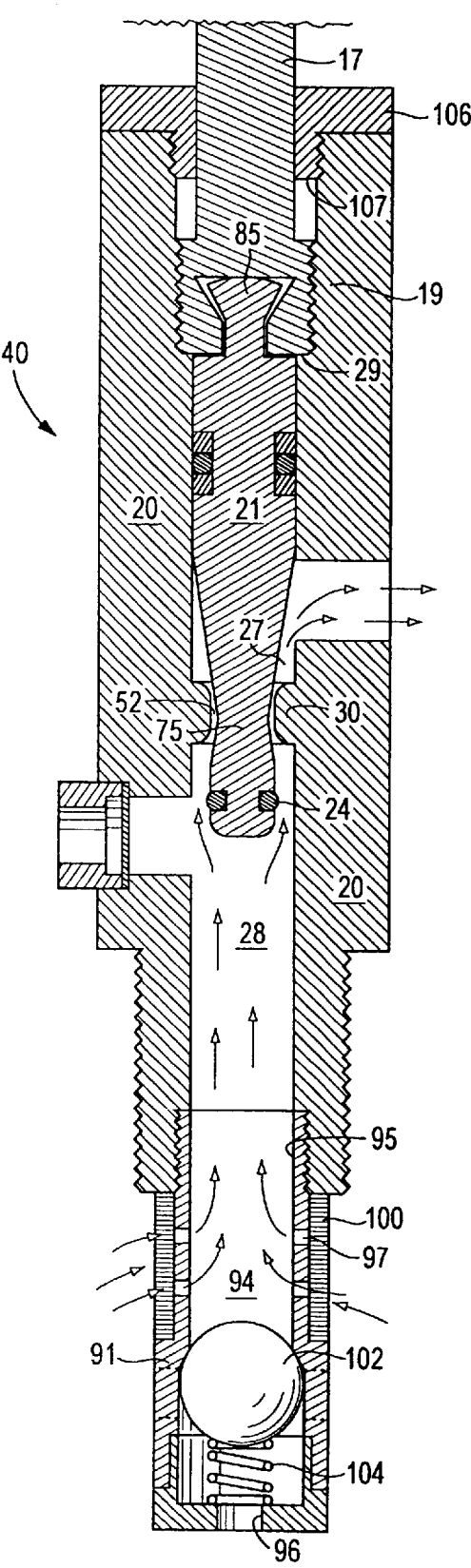
FIG. 11 is an axial sectional view of the valve according to a preferred embodiment of the present invention in the full open position, together with the filter check valve according to the invention in a check position to permit gas to flow through a filter along a discharging route through the valve.
Figure 12:
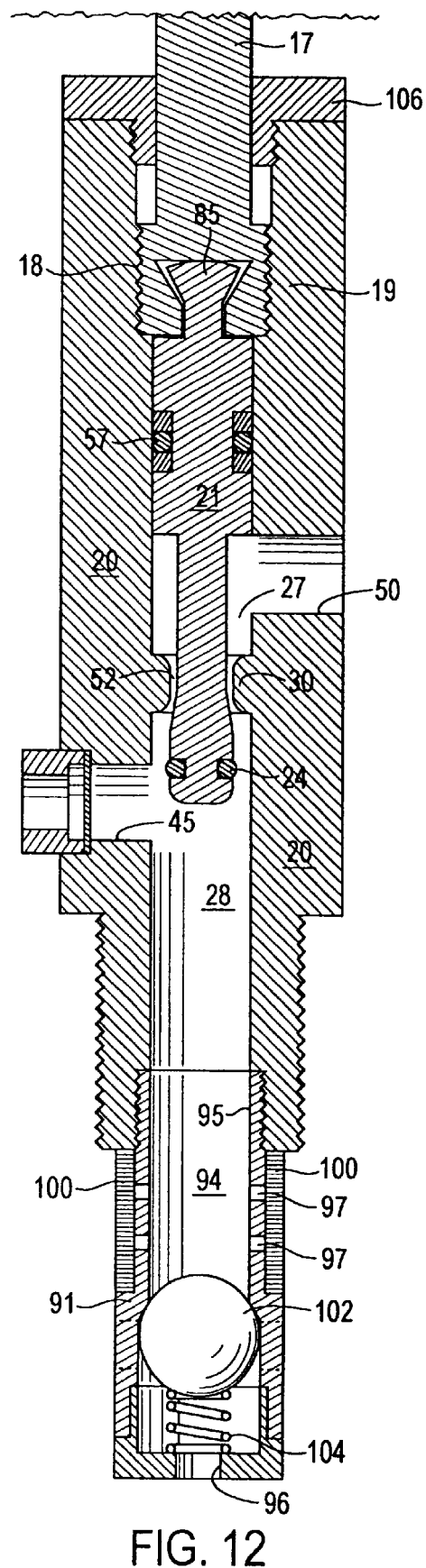
FIG. 12 is an axial sectional view of yet another embodiment of the valve apparatus according to the present invention, showing another version of the non-rotating stem mechanism and a protected seat disposed below the nozzle, and the accompanying filter check-valve feature.

When it is desired to release and regulate the flow of gas from the high pressure zone 42 to the zone of lower pressure 43 (by operation of the handle 17 and stem 21), the valve seat 24 is disengaged from the nozzle 30 to allow gas to flow from the first chamber 28 to the second chamber 27. However, the (now) relatively higher pressure in the high pressure zone 42, coupled with the function of the means for biasing 104, forcibly holds the plug member 102 in a closed position in contact with the plug seat 103. Consequently, gas enters the tunnel 94 from the high pressure zone 42 exclusively via the filter ports 97. Thus, during the discharge of gas from the high pressure zone, all the gas flows through the filter media 100 before passing into the tunnel 94, into the first chamber 28, through the orifice 52, and on toward the second chamber 27, as seen in FIG. 11. Accordingly, debris in the high pressure zone 42 never obtains the tunnel 94; rather, it is retained on the exterior of the filter media 100 and thus is withheld in the zone of higher pressure. No debris blows into the valve 40, where it otherwise could kindle combustion. The bayonet filter check valve 90, therefore, permits debris to blow into a container 15 during charging, but holds the debris there during discharge, protecting downstream components from fast-moving, dangerous debris.

Collective reference is made to FIGS. 2–7. FIG. 2 shows the preferred embodiment in a full open position, whereby maximum discharge through the nozzle 30. FIG. 3 is an enlarged view of a portion of the preferred embodiment, showing the relative positions of the seat 24 and nozzle 30 when the valve is fully open. FIG. 4 shows the preferred embodiment in the full closed position, FIG. 5 being an enlarged view indicating the contact of the seat 24 with the high pressure side 71 of the nozzle. FIG. 6 shows the preferred embodiment at "one turn open" position, i.e., the position of the seat 24 relative to the high pressure side of the nozzle 30 after the handle 17 has been turned through a single rotation. Notably, the turning of the handle through one complete rotation effectuates a very minimal flow area due to the straight section of the stem 21, but provides a large separation of the seat 24 from the nozzle, thereby allowing only a very gradual increase in discharge to prevent deleterious sonic gas releases while translating the nonmetallic seat away from the region of higher gas velocity.

Continued reference is made to FIGS. 2–13. Again, the valve controls the flow of a gas, particularly oxygen or oxygen-enriched air, from a high-pressure zone 42 to a zone of lower pressure 43. Rotation of the handle 17 in the handle-engaging portion 19 shifts the stem 21 to move the seat 24 into and out of contact with the nozzle 30. In the preferred embodiment, the valve seat 24 is contactable with the high-pressure side 71 of the nozzle. At all times, the seat 24 is within the lower first chamber 28. An advantage of this configuration is that the comparatively elevated pressures in the first chamber 28 tend to bias the stem axially "upward" toward the nozzle 30, i.e., toward the closed position. As mentioned, this is in contrast with most known valves. With the seat 24 situated on the high pressure side 71 of the nozzle 30, the user of the apparatus need not torque the handle 17 as forcefully to obtain a reliable closed seal of the seat against the nozzle.

When the valve is closed, as seen in FIGS. 4 and 5, the seat 24 is pressed firmly against the beveled surface 63 of the nozzle. The initial rotation of the handle 17 separates the seat 24 from the high pressure side 71 of the nozzle, and simultaneously induces first a gradual departure of the oblique surface 76 of the throttling portion 75 of the stem from the throat 62 of the nozzle, as seen in FIGS. 6 and 7. In this manner, the danger of a sudden, sonic velocity "rush" of gas from the high pressure zone 42 through the orifice 52 to the zone of lower pressure 43 is substantially and advantageously reduced. Continued rotation of the handle results in the gradual increase of the distance between the throat 62 and or beveled portion 63 of the nozzle 30 and the oblique surface 76 of the throttling portion of the stem.

Figure 14:
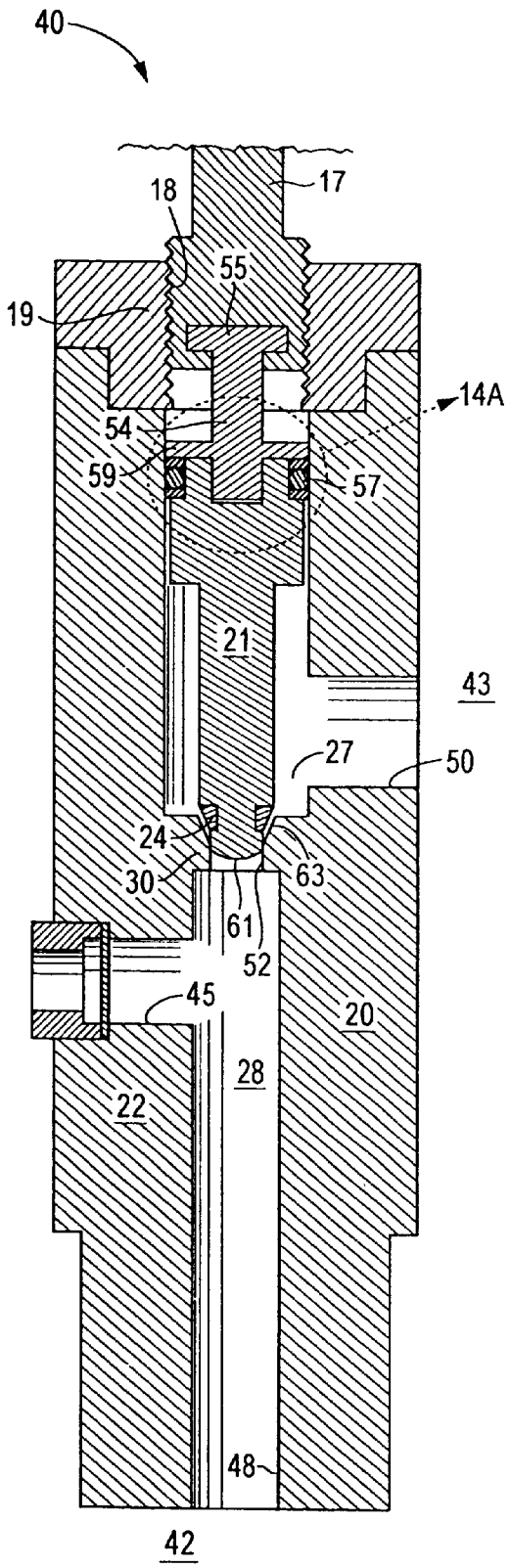
FIG. 14 is an axial sectional view of one embodiment of the valve apparatus according to the present invention showing a non-rotating stem mechanism and a protected seat disposed above the nozzle.
Figure 14A:
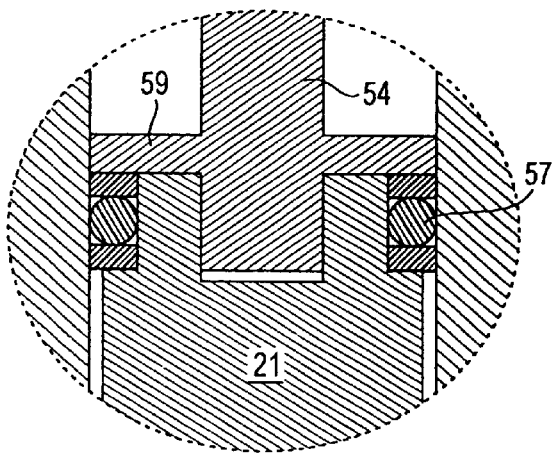
FIG. 14A is an enlarged sectional view of the portion of the stem seal mechanism denoted in FIG. 14.
Figure 14B:
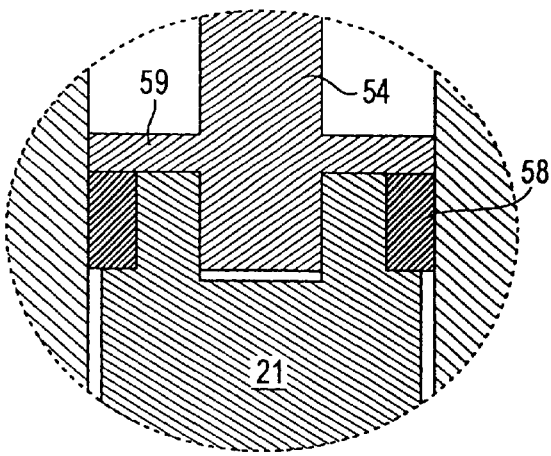
FIG. 14B is an enlarged sectional view of a possible alternative version of the portion of the stem seal mechanism denoted in FIG. 14.

Attention is invited to FIG. 14, showing an alternative embodiment of the present invention. In this embodiment, the seat 24 is situated above the nozzle 30. However, the stem 21 has a distal coaxial extension 61 having a radial shape corresponding to, and a radial dimension just less than, the shape and radius of the orifice 52. This distal axial extension 61 of the stem 21 is a metallic element and actually moves in and out of the orifice 52 with the axial movement of the stem. Being presented directly toward the first chamber 28, axially between that chamber 28 and the seat 24, the distal extension 61 (and the nozzle 52 itself) protects the seat from the impingement of the gas stream at high velocity directly upon the seat 24. Accordingly, in this embodiment, no portion of the stem 21 actually distends into the first chamber 28, but instead presents the simplicity of being fully contained within the second chamber 27. Nevertheless, the seat 24 is protected from direct gas impingement by the distal extension 61, and much of the gas throttling occurs between the distal extension 61 and the nozzle.

As seen in FIG. 14, the handle 17 in this alternative embodiment is threadably engaged with a threaded portion 19 of the end cap 106. A linking pin 54 is provided to transmit axial forces from the handle 17 to the stem 21. However, the linking pin 54 does not rotate, the handle instead rotating around the linking pin head flange 55. A seal 57 in the linking pin 54, together with the top flange 59 of the linking pin, prevents debris from the screwed engagement between handle threads 18 and threaded portion 19 of cap 106 isolates the threads from the wetted portion of the valve.

Figure 15:
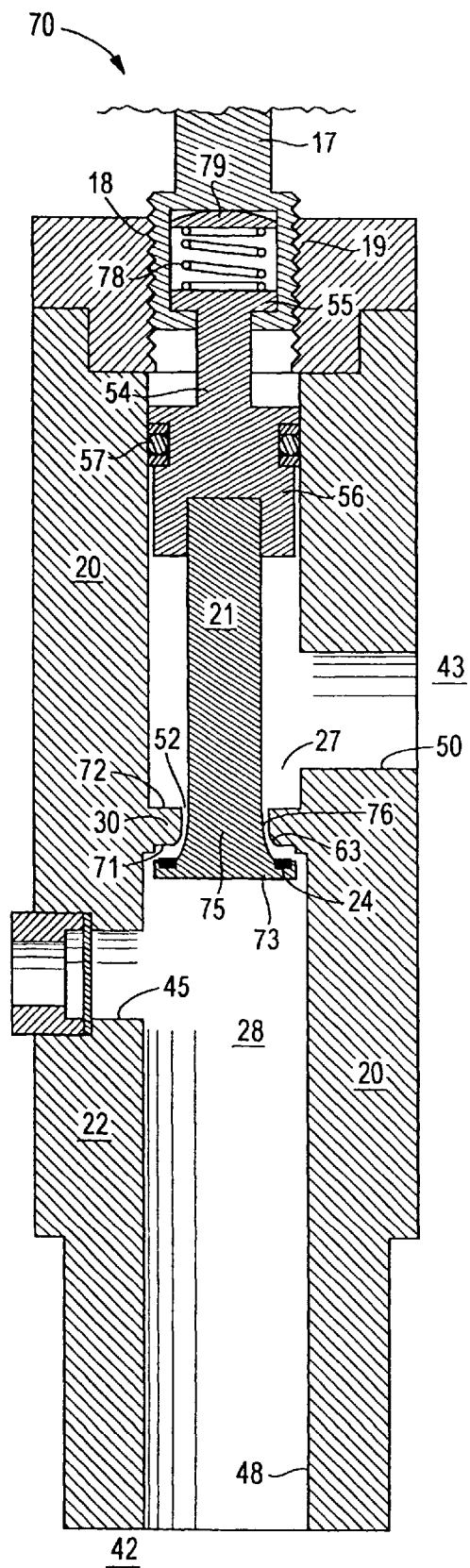
FIG. 15 is an axial sectional view of another embodiment of the valve apparatus according to the present invention, showing a non-rotating stem mechanism and a protected seat disposed below the nozzle, and also showing a built-in excess flow shut-off mechanism.

FIG. 15 illustrates another alternative embodiment of the invention, including an advantageous excess flow shut-off feature, and a specially protected valve seat. The alternative embodiment of FIG. 15 operates very similarly to the preferred embodiment of FIGS. 2–13. However, the use of a specially configured distal portion 73 of the stem 21 compels special assembly of the embodiment where the stem is installed "from the bottom". Again, the valve 70 controls the flow of a gas, particularly oxygen, from a high-pressure zone 42 to a zone of lower pressure 43. The hollow body 20 has a threaded handle-engaging portion 19 and a main portion 22. The first chamber 28 and the second chamber 27 are defined within the body 20, similarly to the embodiment of FIGS. 2–13, and the first chamber 28 is in fluid communication with the high-pressure zone 42 and the second chamber 27 is in fluid communication with the zone of lower pressure 43.

The nozzle 30 separates the chambers 27, 28, the nozzle having a high-pressure side 71 adjacent the first chamber 28, a low-pressure side 72 adjacent the second chamber 27, and an orifice 52 for the passage of gas between the chambers 27, 28. The handle 17 screwably engages with the threaded handle-engaging portion 19 of the body 20. The stem 21 is in operable connection with the handle 17, and is disposed in the second chamber 27, through the orifice 52, and has its distal terminal portion extending into the first chamber 28 as seen in FIG. 15. The annular valve seat 24 is upon the terminal portion 73 of the stem 21, and is contactable with the high-pressure side 71 of the nozzle 30 to seal the orifice 52 against the passage of gas.

Similarly to the preferred embodiment, rotation of the handle 17 shifts the stem 21 to move the seat 24 into and out of contact with the high-pressure side 71 of the nozzle. A terminal flange 73 on the distal terminus of the stem 21 protects the valve seat 24 against direct impingement of a gas stream from the high pressure zone 42. In contrast to the embodiment of FIG. 14, the seat 24 always is within the lower first chamber 28 and is exposed to the comparatively higher pressures that occur there. Yet, as mentioned, because the terminal flange 73 is in confrontational relationship to the intake port 48, it protects the seat from the deleterious frictional and impact forces that occur when the flow chokes downstream of the seat 24 within the nozzle 30. (The gas flows on toward the outlet port 50 when the handle 17 is rotated to move the stem 21 and open the valve 70.)

An advantage of this configuration is that the comparatively elevated pressures in the first chamber 28 tend to bias the stem axially "upward" toward the nozzle 30, i.e., toward the closed position. This is in contrast with most known valves (FIG. 1) and the embodiment of FIG. 14, where static gas pressures tend to force the valve open. With the seat 24 situated on the high pressure side 71 of the nozzle 30, the user of the apparatus need not torque the handle 17 as forcefully to obtain a reliable closed seal of the seat against the nozzle. Over-torquing of the handles of many known devices, in an effort to reliably close the valve, is a factor in the premature destruction of valve seats and the generation of undesirable debris from deteriorating seat materials.

The embodiment of FIG. 15 makes beneficial use of a linking pin 54, which serves the same purpose and function as disclosed in the description of the embodiment of FIG. 14. The head flange 55 of the linking pin 54 is rotatable within the cavity in the distal end of the handle 17, so that when the handle 17 is rotated, the linking pin does not rotate. The rotary motion of the handle 17 therefore is not imparted to the stem 21. However, as the handle 17 shifts axially during rotation, due to its screwed engagement with the handle-engaging portion 19, such axial translation is transmitted to the stem 21 by the linking pin 54.

The alternative embodiment of FIG. 15 features an excess flow shut off mechanism. The excess flow shut off mechanism is a means whereby the flow of gas through the valve 70 from the high pressure zone 42 to the zone of lower pressure 43 is automatically terminated in the event of an abrupt pressure drop in the zone of lower pressure. Such an abrupt pressure drop would be symptomatic of, for example, a catastrophic failure in the downstream gas distribution or delivery system. It is desirable immediately to prevent the flow of gas out the outlet port 50 if the downstream system has ruptured. If the valve 70 is a component in an industrial gas distribution system, the valve 70 may be used to meter flow from a gas source under pressure (the high pressure zone 42) to, for example, a gas mixer to a point downstream in a zone of lower pressure. In the event the mixer ruptures, gas will immediately begin to be lost from the system at the point of the breach. Such rupture may initiate unrestrained flow to a developing fire if not restricted by the excess-flow feature of the valve.

A downstream breach is manifested by an excess flow out the port 50 occasioned by the abrupt pressure drop due to the rupture or breach. Accordingly, it is desirable for the valve 70 automatically to close, immediately to arrest the flow of gas into the "downstream" zone of lower pressure 43, upon detection of the pressure drop caused by the breach.

The excess flow shut off mechanism features a stem 21 that can move axially independently of the handle 17. Referring to FIG. 15, it is seen that the handle 17 is rotatable to move the stem 21 between a closed position with the seat 24 in contact with the nozzle 30 and an open position with the seat out of contact with the nozzle. However, the stem 21 under selected conditions is axially movable in relation to the handle 17. A cavity within the distal end of the handle 17 contains the linking pin head 55. (Alternative embodiments include no linking pin, in which instances the proximate end of the stem 21 features a head similar to pin head 55.) The disposition of the head 55 within the handle cavity allows the handle to impart axial movement to the stem 21. Also in the handle cavity are a spring 78 and a spring cap 79. The spring 78 abuts against, or is attached to, the head 55 of the linking pin 54. The spring 78 also abuts the cap 79. The spring 78 ordinarily is in a neutral condition, balanced against the cylinder pressure.

However, it is seen that when the handle 17 is rotated to move axially down into the valve body 20, the handle will also move the cap 79 down "ahead of" the handle. The moving cap 79 will compress the spring 78, which will return elastically to rest condition and thus press against the linking pin head 55, thereby also urging the stem 21 downward. The resistance of the spring 78 to compression between the cap 79 and the linking pin 54 thus permits the handle 17 to force the stem axially down in the valve toward the "open" condition. (The oversize link pin head 55 retained within the cavity of the handle permits the handle to pull the link pin 54 and stem 21 upward toward the closed position.)

The cap 79 provides a bearing to allow rotational movement of the handle 17 while maintaining the spring and linkage pin in a non-rotating configuration. Rotation of the handle relative to the bearing surfaces provided by the rounded end of the cap 79 and the top of the linkage pin 55 allows rotation of the handle to result in non-rotating axial movement of the stem. Since axial movement of the linking pin 54 results in a corresponding axial movement of the stem 21 to which the linking pin is attached, the spring 78 effectively acts as a means for biasing the stem axially away from the handle 17.

Under normal operating conditions, the threaded engagement between the handle 17 and the handle-engaging portion 19, and the linkage between the linking pin 54 and the stem 21, combined with the urging of the spring 78 to avoid a compressed state, causes the handle 17, the spring 78, the linking pin 54, and the stem 21 to move axially in concert, nearly as if a single unit. This is a consequence of the force of the spring 78, which tends to maintain the head of the linking pin 55 pressed against the bottom of the cavity in the handle 17, the condition illustrated in FIG. 15. Stated differently, the cap 79 and the link pin head 55 ordinarily are pressed by the spring 78 to the axial extremes of the handle cavity.

However, when the stem 21 is in an open position with the seat 24 separated from the nozzle 30, if the gas pressure in the second chamber 27 abruptly decreases, the resulting rapid change in the pressure gradient across the distal portion 73 of the stem overcomes the compressive force of the spring 78 (or other suitable means for biasing), which automatically moves the stem to the closed position to seal the orifice 52 against the continued passage of gas. The increased pressure gradient causes an increase in the force on the stem's terminal flange 73, which balances the spring force and pushes the stem 21 and link pin 54 axially upward, shifting the link pin head 55 upward in the handle cavity and against the compressive force of the spring 78. This shifting movement closes the seat 24 against the nozzle 30. The valve remains in a "balanced" condition and only allows "weeping" flow (very minimal) as long as the downstream pressure is prevented from increasing due to the failure which caused the breach. The spring constant of the spring 78 can be selected to determine the desired sensitivity of the excess flow shut off mechanism. The "stiffer" the spring, the greater the abruptness of the pressure drop required to actuate the shut-off feature. The invention thus provides an adjustable automatic shut off against excess flow into the zone of lower pressure 43.

FIG. 15 illustrates that the seal 57 can be disposed radially between the walls of the body 20 and the distal or tail portion 56 of the linking pin 54. This is in distinction to the embodiment of FIG. 14, where the seal member or members 57 are situated radially between the circumference of the stem 21 and the body 20. However, either configuration serves as well to prevent the threaded engagement of the rotating handle 17 with the handle engaging portion 19 from being wetted by the gas.

FIG. 16 illustrates yet another alternative embodiment of the valve 80 according to the present invention, including a protected valve seat 24 disposed below the nozzle 30, and the non-rotating stem feature as previously described for the embodiments of FIGS. 14 and 15, as well as the an advantageous filter check valve mechanism. Reference numerals in FIG. 16 refer to like elements as labeled with like reference numerals in all the foregoing described embodiments. Accordingly, the foregoing description of the operation of the preferred embodiment, and those of FIGS. 14 and 15, serve to inform a description of the embodiment of FIG. 16. Again, the valve 80 controls the flow of a gas, particularly oxygen, from a high-pressure zone 42 to a zone of lower pressure 43. The hollow body 20 has a threaded handle-engaging portion 19 and a main portion 22. The first chamber 28 and the second chamber 27 are defined within the body 20, similarly to the embodiment of FIG. 15, and the first chamber 28 is in fluid communication with the high-pressure zone 42 and the second chamber 27 is in fluid communication with the zone of lower pressure 43.

The nozzle 30 within the body 20 separates the chambers 27, 28, the nozzle having a high-pressure side 71 adjacent the first chamber 28, a low-pressure side 72 adjacent the second chamber 27, and an orifice 52 for the passage of gas between the chambers 27, 28. A rotatable threaded handle 17 screwably engages with the threaded handle-engaging portion 19 of the body 20. The stem 21 is in operable connection with the handle 17, and is disposed in the second chamber 27, through the orifice 52, and has its distal terminal portion extending into the first chamber 28 as seen in FIG. 16. The annular valve seat 24, such as an O-ring, is mounted within a circular recess in the distal portion 73 of the stem 21. The seat 24 extends radially outward from the stem 21 and adequate distance so as to be contactable with the high-pressure side 71 of the nozzle 30, specifically the annular ridge 82 that encircles the high pressure side of the orifice 52. The pressing of the seat 24 against the ridge 82 seals the orifice 52 against the passage of gas.

Similarly to the embodiment of FIG. 15, rotation of the handle 17 in the handleengaging portion 19 shifts the stem 21 to move the seat 24 into and out of contact with the nozzle 30. Like the embodiment of FIG. 15, the valve seat 24 is contactable with the high-pressure side 71 of the nozzle. A stem cap 84 affixed to the distal terminus of the stem 21 protects the valve seat 24 against direct impingement of a gas stream from the high pressure zone 42. The seat 24 always is within the lower first chamber 28 and is exposed to the comparatively higher pressures associated with the zone of higher pressure 42. Because the stem cap 84 is in confrontational relationship to the intake port 48, it protects the protruding portion of the seat 24 from frictional and impact forces that accompany the stream of gas from the intake port 48. Advantageously, the comparatively elevated pressure in the first chamber 28 tends to push the stem toward the "closed" position. With the seat 24 situated on the high pressure side 71 of the nozzle 30, the user of the apparatus need not torque the handle 17 as forcefully to obtain a reliable closed seal of the seat against the nozzle.

Continued reference to FIG. 16 shows that the stem 21 has a throttling portion 75 disposed coaxially within the orifice 52. The throttling portion 75 features an annular surface that is obliquely angled in relation to the central axis of the valve 80. Axial movement of the stem 21 varies the distance between the oblique surface 76 and the nozzle 30. Since the throttling portion 75 and the nozzle 30 each preferably are made from a durable, compact, and non-flammable metal, all the throttling of the gas during a charging flow or a discharging flow through the valve 80 advantageously occurs between the comparatively damage- and combustion-resistant throttling portion 75 and nozzle 30.

In this embodiment, as with the embodiment of FIG. 15, one or more seal members 57 are disposed axially between the threaded handle-engaging portion 19 of the body and the second chamber 27, so that debris generated by the rotation of the handle 17 in abrasive contact with the handle-engaging portion of the body is prevented from entering the second chamber 27 by the presence of the seal member 57. FIG. 16 shows that the seal member 57 can be disposed radially between the walls of the body 20 and the linking pin 54 to prevent the threaded engagement of the rotating handle 17 with the handle engaging portion 19 from being wetted by the gas from the second chamber 27. While the linking pin 54 is in smooth sliding contact with the walls of the body 20, the sealing member or members 57 are located axially between the second chamber 27 and the threaded portion 18 of the handle.

Like the previously described embodiments, the embodiment of FIG. 16 makes beneficial use of a linking pin 54, which serves the same purpose and function as disclosed in the description of the embodiment of FIG. 14.

The embodiment seen in FIG. 16 includes the use of the bayonet filter check valve 90, which is configured and functions substantially similarly to the bayonet valve 90 described herein above for the preferred embodiment of FIGS. 8–13. The bayonet filter check valve 90 functions essentially the same as the version described above in reference to FIG. 16. The filter check valve 90 features a hollow inner casing 91 defining an axial interior tunnel 94. The inner casing 91 has a proximate end attachable to the distal end of the body 20 body. The inner casing has at least one connection port 95 at its proximate end and in fluid communication with the first chamber 28 when the proximate end is attached to the body 20, whereby gas may flow between the first chamber 28 and the tunnel 94. The casing 91 also has a distal end having at least one charging port 96 therein in fluid communication with the tunnel 94. At least one, and preferably a plurality, of filter ports 97 are provided in the casing 91 axially intermediate to the connection port 95 and the charging port 96, through which gas may flow between the interior tunnel 94 and the exterior of the inner casing 91. A filter media 100 is disposed in or over the filter ports 97 so that gas flowing through a filter port must flow through the filter media.

A plug member 102, preferably a sapphire ball, is disposed within the casing 91 adjacent to the charging port 96, and is movable axially between an open position and a closed position. In the closed position, as seen in FIG. 8, the plug member 102 is in sealing contact with the plug seat 103; when the plug member 102 is in an open position, it is disengaged and apart from the plug seat 103, such separation allowing gas to flow between the tunnel 94 and the charging port 96.

A biasing means, such as a coil spring 104, pushes the plug member 102 toward the closed position in contact with the plug seat 103. When in the closed position, the plug member 102 prevents gas flow in the tunnel 94 directly from the charging port 96 to the connection port 95, whereby any gas flowing through the tunnel 94 is forced through the filter media 100. Further when the plug member 102 is in the open position, gas may flow through the tunnel directly from the connection port 95 to the charging port 96. Under most pressure conditions, the plug member 102 is pushed and held in sealed contact with the plug seat 103 by the action of the spring 104.

During the filling or charging process, as depicted in FIG. 10, gas flows, as shown by the directional arrows of the figure, from the zone of lower pressure 43, through the outlet port 50, through the second chamber 27 and the nozzle 30, on through the first chamber 28 and into the tunnel 94. The increased pressure in the tunnel 94 forces the plug member 102 axially downward and away from the plug seat 103, thus pushing the plug member 102 into an open position. The flowing gas therefor is free to flow directly from the tunnel 94 on through the charging ports 96 and into the interior of a container cylinder. The force of the charging gas flowing into the tunnel 94 overcomes the force of the means for biasing 104, and maintains it in a compressed condition and the plugging member 102 disengaged from the plug seat 103 throughout the charging process.

Upon complection of the charging process, and with the cessation of gas flowing into the valve 80 from the zone of lower pressure 43, the means for biasing 104 is released and urges the plug member 102 back into contact with the seat 103 to prevent any retrograde flow of gas from the high pressure zone 42 into the tunnel 94 via the charging ports 96.

During gas discharge, as indicated by the directional arrows of FIG. 11, the valve seat 24 is disengaged from the nozzle 30 to allow gas to flow from the first chamber 28 to the second chamber 27. However, the relatively higher pressure in the high pressure zone 42, coupled with the function of the means for biasing 104, forcibly holds the plug member 102 in a closed position in contact with the plug set 103. Consequently, gas enters the tunnel 94 from the high pressure zone 42 exclusively via the filter ports 97. Thus, during the discharge of gas from the high pressure zone, all the gas flows through the filter media 100 before passing into the tunnel 94, into the first chamber 28, through the orifice 52, and on toward the second chamber 27. Accordingly, debris in the high pressure zone 42 never obtains the tunnel 94; rather, it is retained on the exterior of the filter media 100 and thus is withheld in the zone of higher pressure. No debris blows into the valve 80, where it otherwise could kindle combustion. The bayonet filter check valve 90, therefore, permits debris to blow into a container 15 during charging, but holds the debris there during discharge, protecting downstream components from fast-moving, dangerous debris.

FIG. 17 shows the bayonet filter check valve 90 disposed in position upon a cylinder or container 15. The filter check valve 90, as shown in FIGS. 8–11, may extend into the interior 13 of the container 15. The filter check valve 90 may be connected with known conventional valve assemblies 10 (FIG. 1), and thus may be used independently of the valve assembly 40, 70, 80, or 90 according to the present invention. However, the check valve 90 preferably is used in conjunction with the valve assembly 40, 70, 80, or 90 according to the present invention, to maximize the benefits thereof.

The elements and function of the bayonet filter check valve 90 may be integrated with the elements of an excess flow shut-off feature. Attention is invited to FIGS. 18A–18C, enlarged views of a combination filter check valve and excess flow valve. The elements of the excess flow cut-off mechanism are interrelated with the filter check valve 90 previously described. It is seen that the charging port 96 on the filter check valve is in fluid communication with the high-pressure zone 42, provided the plug member 102 and the check stopper 116 are both in an open position, as they appear in FIG. 18C. Thus, the excess flow check valve assembly is a device which operates in concert with the plug member 102 of the filter check valve. The excess flow check valve assembly further includes a hollow outer casing 107 disposed generally coaxially around and partially containing the inner casing 91 of the filter check valve 90. An annular vent space 108 is defined between the outer casing 107 and the inner casing 91. An excess flow pressure chamber 110 is defined in part by the outer casing 107 and is in fluid communication with the charging port 96. At least one gas aperture 112 is provided in the outer casing 107 through which gas may flow between the pressure chamber 110 and the high pressure zone 42. Also, at least one vent opening 114 provides for fluid communication with the vent space 108 and the excess flow pressure chamber 110. A check stopper 116 is disposed in the pressure chamber 110 between the vent opening 114 and the gas aperture 112. The stopper 116 is movable axially between an open position and a closed position. The check stopper 116 is depicted in the open position in FIGS. 18A and 18C, and in the closed position in FIG. 18B. It also is noted that the plug member 102 is in the closed position in FIGS. 18A and 18B, and is in the open position in FIG. 18C. When the plug member 102 is in the closed position, the charging port 96 is blocked thereby to prevent the flow of gas through that port. The operation of the plug member 102 has no affect upon the closing or opening of the vent opening 114. When the check stopper 116 is in the closed position, gas is prevented from flowing through the vent opening 114, while the movement of the check stopper 116 to the closed position blocks and closes the vent opening 114 to the passage of gas.

A spring 104 or other means is provided for biasing the check stopper 102 toward the open position. In the preferred embodiment, the means for biasing the check stopper 116 toward the open position also is the means for biasing the plug member 102 toward the closed position; that is a single spring 104 preferably may serve as the means for biasing the check stopper toward the open position, as well as the means for biasing the plug member toward the closed position. In alternative embodiments, separate means, such as separate but coaxially disposed coil springs, may function as the distinct means for biasing.

When in the closed position, the check stopper 116 prevents gas flow between the vent space 108 and the pressure chamber 110 through the vent opening. Further, when the check stopper 116 is in the open position, gas may flow from the gas aperture 112 to tunnel 94 via pressure chamber 110, vent opening 114, vent space 108, and filter ports 97 in the inner casing 91 (and thus also through the filter media 100). When the check stopper 116 is in the open position, and when the gas pressure in the first chamber 28 (and thus also in the tunnel 94) abruptly decreases, a pressure differential occurs between the excess flow pressure chamber 110 and the first chamber 28, which automatically moves the check stopper 116 to the closed position to seal the vent opening 114 against the passage of gas.

The overall operation of the check-valve excess flow cut-off valve assembly is placed in the context of the operation of the invention. Reference first is made to FIG. 18C, which shows the condition of the apparatus during a normal charging operation. During charging, such as the filling of a portable tank to which the apparatus is attached, gas flows downward through the tunnel 94 via the connection port 95 from the first chamber 28 (not seen in FIGS. 18A–18C), as suggested by the single directional arrow in FIG. 18C. The rush of the downwardly moving charging gas, and the resulting pressure differential across the plug member 102, presses against the plug member and pushes it downward against the force of the spring 104. The spring 104 is placed into a compressed condition. The compressed spring 104 concurrently also urges the check stopper 116 downward to abut against the top of an inner cylindrical wall 118 or the like. The in-rushing gas holds the stopper member 102 in the open position, allowing gas to flow through the charging port 96, into the excess flow pressure chamber 110, and out the gas aperture(s) 112 into the high pressure zone 42 to pressurize it. When the high pressure zone is charged, e.g. when a cylinder tank is filled as desired, the operator rotates the handle 17 (not seen in FIGS. 18A–18C) to close the main valve and stop the flow of gas, at which time the action of the compressed spring 104 is to push the plug member into the closed position to seal the charging port 96. It is apparent, further, that if the high pressure zone is fully charged with pressurized gas, the pressure differential across the plug member 102 deceases, and the spring 104 biases the plug member upward into contact with the distal end of the inner case 91 to close the charging port 96.

When there is no gas flowing through the apparatus, the plug member 102 and the check stopper 116 assume The positions seen in FIG. 18A. The plug member 102 is abutted against the inner casing 91, while the spring 104 presses against the unmoving plug member and urges the check stop 116 down to hold it in the open position against The wall 118 as seen in FIG. 18A.

To permit the flow of gas from the high pressure zone 42, the user actuates the handle 17 to open the main valve (e.g. valve 80) as previously explained. The deliberate opening of the main valve permits gas to flow from the high pressure zone 42, through the gas apertures 112, and into the chamber 110 as indicated by the directional arrows of FIG. 1 8A. Because the spring 104 holds the plug member 102 in the closed position and the check stopper in the open position as seen in FIG. 18A, the gas is free to flow from the chamber 110 into the vent space 108 via the vent openings 114. From the vent space 108, the discharging gas flows through the filter media 100, through the filter ports 97 in the inner casing 91, and into the tunnel 94, as suggested by directional arrows in FIG. 18A. Deleterious debris is prevented by the filter media 100 from passing from the vent space 108 into the tunnel 94, where such debris could kindle combustion as it otherwise would be carried at high speed toward downstream components.

Gas thus continues to flow from the high pressure zone 42, to the connection port 95, and on into the main valve assembly for discharge into the down stream zone of lower pressure until the main valve assembly is deliberately closed or until a charged tank is exhausted. Throughout this normal discharging process and condition, the elements of the assembly are maintained in the relative positions seen in FIG. 18A.

In the event of an abrupt, e.g. catastrophic drop in pressure in the tunnel 94 (accompanied by a pressure drop in the first chamber 28 of the main valve), a dramatic pressure differential develops across the check stopper 116. The abrupt decrease in pressure in the tunnel 94, with the continued elevated pressure in the pressure chamber 110, results in an upward force against the check stopper 116. This upwardly directed pressure force overcomes the force of the spring 104, and compresses it. The check stopper 116 automatically and nearly instantly shifts axially upward to the closed position seen in FIG. 18. The relatively higher pressure in the chamber 110 holds the check stopper in the closed position, allowing only "weeping" (low) flow into the tunnel 94 as long as the pressure downstream of the valve is prevented from increasing by a breach. The maintained closed position of the check stopper 116 also holds the plug member closed. Consequently, with the plug member and the check stopper so positioned as seen in FIG. 18B, the flow of gas into the tunnel 94 is greatly minimized. The plug member 102 and check stopper 116 remain closed under the pressure of the zone of higher pressure 42, and until the cause of the abrupt downstream pressure drop is addressed and remediated. The spring constant of the spring 104 can be selected to determine the desired sensitivity of the excess flow shut off mechanism. The "stiffer" the spring, the greater the abruptness of the pressure drop required to actuate the shut-off feature. Of course, the spring 104 must also be sufficiently mild so as to permit the inward flow of gas to compress the spring to allow the plug member 102 to shift axially against the force of the spring to the open position of FIG. 18C, so that the "charging" operation may be accomplished when desired.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A valve apparatus for controlling the flow of a gas between a high-pressure zone and a zone of lower pressure, said apparatus comprising:
   a hollow body having an axis, a threaded handle-engaging portion and a main portion;
   a first chamber and a second chamber, said chambers defined within said body and said first chamber in fluid communication with the high-pressure zone and said second chamber in fluid communication with the zone of lower pressure;
   a nozzle within said body and separating said chambers, said nozzle having a wall defining a cylindrical throat and an orifice for the passage of gas between said chambers;
   a rotatable threaded handle screwably engageable with said handle-engaging portion of said body;
   a stem rotatably connected with said handle whereby said handle may rotate with respect to said stem, and said stem comprising:
      a substantially cylindrical distal portion; and
      a throttling portion disposable coaxially within said throat, said throttling portion comprising an annular surface oblique in relation to said axis, wherein axial movement of said stem varies the position of said throttling portion in relation to said nozzle;
   a seat on said distal portion of said stem and contactable with said nozzle to seal said orifice against the passage of gas; and
   at least one seal member disposed axially between said threaded handle-engaging portion and said second chamber;
   wherein rotation of said handle in said handle-engaging portion shifts said stem axially to move said seat into and out of contact with said nozzle, and said distal portion into and out of contact with said throat wall.

2. An apparatus according to claim 1 wherein said nozzle comprises a high-pressure side adjacent said first chamber and a low-pressure side adjacent said second chamber, and said stem is disposed in said second chamber and extending through said orifice, wherein said distal portion of said stem protrudes into said first chamber, and axial shifting of said stem moves said seat into and out of contact with said high-pressure side of said nozzle to seal and unseal said orifice to the passage of gas there through.

3. An apparatus according to claim 2 wherein said seat comprises an elastic O-ring and wherein when said seat is in contact with said nozzle, gas pressure in said first chamber biases said seat toward said nozzle.

4. An apparatus according to claim 3 wherein said nozzle comprises an annular beveled surface defining a circumference of said orifice coaxial with said oblique surface of said throttling portion.

5. An apparatus according to claim 3 wherein said throttling portion and said nozzle each comprise metal, wherein all throttling of the gas during a charging flow and a discharging flow occurs between said throttling portion and said nozzle.

6. An apparatus according to claim 5 wherein axial movement of said distal portion of said stem into said first chamber increases the distance between said oblique surface and said nozzle, wherein the rate of dilation of said distance between said oblique surface and said nozzle increases with continuing rotation of said handle.

7. An apparatus according to claim 6 wherein said stem is in sliding contact with said body, and further comprising at least one seal member disposed radially between said stem and said body, and axially between said threaded handle-engaging portion and said second chamber, wherein debris generated by the rotation of said handle in said handle-engaging portion is prevented by said stem and said seal member from entering said second chamber.

8. An apparatus according to claim 2 wherein:
   said handle is rotatable to move said stem between a closed position with said seat in contact with said nozzle and an open position with said seat out of contact with said nozzle;
   said stem is axially movable in relation to said handle; and
   further comprising means for biasing said stem axially away from said handle;
      wherein when said stem is in the open position with said seat separated from said nozzle, if the gas pressure in said second chamber abruptly decreases, the resulting rapid change in the pressure gradient across said distal portion of said stem overcomes the compressive force of said means for biasing to automatically move said stem to the closed position to seal said orifice against the continued passage of gas there through.

9. An apparatus according to claim 8 further comprising a filter check comprising:
   a hollow casing defining an axial interior tunnel and comprising:
      a proximate end attachable to said body;
      at least one connection port at said proximate end and in fluid communication with said first chamber when said proximate end is attached to said body, whereby gas may flow between said first chamber and said tunnel;

a distal end having at least one charging port therein in fluid communication with said tunnel;

at least one filter port intermediate to said connection port and said charging port, through which gas may flow between said interior tunnel and the exterior of said inner casing; and filter media disposed in said at least one filter port;

a plug member disposed adjacent to said charging port, and movable axially between an open position and a closed position; and means for biasing said plug member toward the closed position;

wherein when in the closed position, said plug member prevents gas flow in said tunnel directly from said charging port to said connection port, whereby any gas flowing through said tunnel is forced through said filter media, and wherein further when said plug member is in the open position, gas may flow through said tunnel directly from said connection port to said charging port.

10. An apparatus according to claim 9 wherein said charging portal is in fluid communication with the high-pressure zone, and further comprising:

a hollow outer casing disposed generally coaxially around and partially containing said inner casing to define a vent space between said outer casing and said inner casing;

an excess flow pressure chamber defined in part by said outer casing and in fluid communication with said charging port;

at least one gas aperture in said outer casing through which gas may flow between said pressure chamber and the high pressure zone;

at least one vent opening providing fluid communication between said vent space and said excess flow pressure chamber;

a check stopper disposed in said pressure chamber between said vent opening and said gas aperture, and movable axially between an open position and a closed position; and means for biasing said check stopper toward the open position;

wherein when in the closed position, said check stopper prevents gas flow between said vent space and said pressure chamber through said vent opening; and wherein further when said check stopper is in the open position, gas may flow from said gas aperture to said tunnel via said pressure chamber, said vent opening, said vent space, and said filter port; and wherein further when said check stopper is in the open position, and when the gas pressure in said first chamber abruptly decreases, a pressure differential occurs between said excess flow pressure chamber and said first chamber which automatically moves said check stopper to the closed position to substantially close said vent opening against the passage of gas.

11. A valve apparatus for controlling the flow of a gas from a high-pressure zone to a zone of lower pressure, said apparatus comprising:

a hollow body having an axis, a threaded handle-engaging portion, and a main portion;

a first chamber and a second chamber, said chambers defined within said body and said first chamber in fluid communication with the high-pressure zone and said second chamber in fluid communication with the zone of lower pressure;

a nozzle within said body and separating said chambers, said nozzle having an orifice and throat for the passage of gas between said chambers;

a stem, movable axially in said body, disposed in said second chamber and extending through said orifice, and comprising:

a proximal portion and a distal portion, said distal portion protruding into said first chamber; and a throttling portion disposable coaxially within said throat, said throttling portion comprising an annular surface oblique in relation to said axis, wherein axial movement of said stem varies the position of said oblique surface in relation to said nozzle;

a threaded handle screwably engageable with said handle-engaging portion of said body and rotatably connected to said proximate portion of said stem, said handle rotatable about said axis in relation to said body and said stem; and an elastomeric seat on said distal portion of said stem and contactable with said nozzle to seal said orifice against the passage of gas;

wherein rotation of said handle in said handle-engaging portion controllably shifts said stem axially to move said seat into and out of contact with said nozzle, and wherein said throttling portion and said nozzle each comprise a metal, wherein all throttling of the gas during a charging flow and a discharging flow occurs between said throttling portion and said nozzle.

12. An apparatus according to claim 11 wherein said seat comprises an O-ring.

13. An apparatus according to claim 12 wherein when said seat is in contact with said nozzle, gas pressure in said first chamber biases said seat toward said nozzle.

14. An apparatus according to claim 11 wherein said nozzle comprises an annular beveled surface defining a circumference of said orifice coaxial with said oblique surface.

15. An apparatus according to claim 14 wherein axial movement of said distal portion of said stem into said first chamber increases the distance between said oblique surface and said beveled surface, wherein the rate of dilation of said distance between said oblique surface and said beveled surface increases with continuing rotation of said handle.

16. An apparatus according to claim 11 wherein said stem is in sliding contact with said body, and further comprising at least one seal member disposed radially between said stem and said body, and axially between said threaded handle-engaging portion and said second chamber, wherein debris generated by the rotation of said handle in said handle-engaging portion is prevented by said stem and said seal member from entering said second chamber.

17. An apparatus according to claim 11 wherein:

said handle is rotatable to move said stem between a closed position with said seat in contact with said nozzle and an open position with said seat out of contact with said nozzle;

said stem is axially movable in relation to said handle; and further comprising means for biasing said stem axially away from said handle; wherein when said stem is in the open position with said seat separated from said nozzle, if the gas pressure in said second chamber abruptly decreases, the resulting rapid change in the pressure gradient across said distal portion of said stem overcomes the compressive force of said means for biasing to automatically move said stem to the closed position to seal said orifice against the continued passage of gas there through.

18. An apparatus according to claim 11 further comprising a filter check comprising:
- a hollow casing defining an axial interior tunnel and comprising:
  - a proximate end attachable to said body;
  - at least one connection port at said proximate end and in fluid communication with said first chamber when said proximate end is attached to said body, whereby gas may flow between said first chamber and said tunnel;
  - a distal end having at least one charging port therein in fluid communication with said tunnel;
  - at least one filter port intermediate to said connection port and said charging port, through which gas may flow between said interior tunnel and the exterior of said inner casing; and
  - filter media disposed in said at least on filter port;
- a plug member disposed adjacent to said charging port, and movable axially between an open position and a closed position; and
- means for biasing said plug member toward the closed position; wherein when in the closed position, said plug member prevents gas flow in said tunnel directly from said charging port to said connection port, whereby any gas flowing through said tunnel is forced through said filter media, and wherein further when said plug member is in the open position, gas may flow through said tunnel directly from said connection port to said charging port.

19. An apparatus according to claim 18 wherein said charging portal is in fluid communication with the high-pressure zone, and further comprising:
- a hollow outer casing disposed generally coaxially around and partially containing said inner casing to define a vent space between said outer casing and said inner casing;
- an excess flow pressure chamber defined in part by said outer casing and in fluid communication with said charging port;
- at least one gas aperture in said outer casing through which gas may flow between said pressure chamber and the high pressure zone;
- at least one vent opening providing fluid communication between said vent space and said excess flow pressure chamber;
- a check stopper disposed in said pressure chamber between said vent opening and said gas aperture, and movable axially between an open position and a closed position; and
- means for biasing said check stopper toward the open position; wherein when in the closed position, said check stopper prevents gas flow between said vent space and said pressure chamber through said vent opening, and wherein further when said check stopper is in the open position, gas may flow from said gas aperture to said tunnel via said pressure chamber, said vent opening, said vent space, and said filter port; and wherein further when said check stopper is in the open position, and when the gas pressure in said first chamber abruptly decreases, a pressure differential occurs between said excess flow pressure chamber and said first chamber which automatically moves said check stopper to the closed position to substantially hinder said vent opening against the passage of gas.

20. A valve apparatus for controlling the flow of a gas between a high-pressure zone and a zone of lower pressure, said apparatus comprising:
- a hollow body having a central axis, a threaded handle-engaging portion and a main portion;
- a first chamber and a second chamber, said chambers defined within said body and said first chamber in fluid communication with the high-pressure zone and said second chamber in fluid communication with the zone of lower pressure;
- a nozzle within said body and separating said chambers, said nozzle defining an orifice for the passage of gas between said chambers;
- a rotatable threaded handle screwably engageable with said handle-engaging portion of said body;
- a stem rotatably connected with said handle whereby said handle may rotate with respect to said stem, and said stem having a distal portion;
- a seat on said distal portion of said stem and contactable with said nozzle to seal said orifice against the passage of gas;
- at least one seal member disposed axially between said threaded handle-engaging portion and said second chamber;
- a hollow casing defining an axial interior tunnel and comprising:
  - a proximate end attachable to said body;
  - at least one connection port at said proximate end and in fluid communication with said first chamber when said proximate end is attached to said body, whereby gas may flow between said first chamber and said tunnel;
  - a distal end having at least one charging port therein in fluid communication with said tunnel;
  - at least one filter port intermediate to said connection port and said charging port, through which gas may flow between said interior tunnel and the exterior of said inner casing; and
  - filter media disposed in said at least on filter port;
- a plug member disposed adjacent to said charging port, and movable axially between an open position and a closed position; and
- means for biasing said plug member toward the closed position; wherein rotation of said handle in said handle-engaging portion shifts said stem axially to move said seat into and out of contact with said nozzle, and wherein during its rotation, said handle rotates with respect to said stem is rotatably fixed in relation to said body; and wherein when in the closed position, said plug member prevents gas flow in said tunnel directly from said charging port to said connection port, whereby any gas flowing through said tunnel is forced through said filter media, and wherein further when said plug member is in the open position, gas may flow through said tunnel directly from said connection port to said charging port.

* * * * *